US011265813B2

(12) United States Patent
Åström et al.

(10) Patent No.: US 11,265,813 B2
(45) Date of Patent: Mar. 1, 2022

(54) SUPPORT FOR A WIRELESS DEVICE WITH A WAKE-UP RECEIVER

(71) Applicant: Telefonaktiebolaget LM Ericsson (publ), Stockholm (SE)

(72) Inventors: Magnus Åström, Lund (SE); Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 16/407,991

(22) Filed: May 9, 2019

(65) Prior Publication Data
US 2019/0342833 A1 Nov. 7, 2019

Related U.S. Application Data

(60) Provisional application No. 62/667,660, filed on May 7, 2018.

(51) Int. Cl.
*H04W 52/02* (2009.01)
*H04W 8/08* (2009.01)
*H04W 24/08* (2009.01)
*H04W 68/00* (2009.01)

(52) U.S. Cl.
CPC ......... *H04W 52/0232* (2013.01); *H04W 8/08* (2013.01); *H04W 24/08* (2013.01); *H04W 68/005* (2013.01)

(58) Field of Classification Search
CPC ... H04W 52/0232; H04W 8/08; H04W 24/08; H04W 68/005; H04W 8/24; H04W 76/28; H04W 60/04; Y02D 30/70
See application file for complete search history.

(56) References Cited

U.S. PATENT DOCUMENTS

2018/0332533 A1* 11/2018 Bhattad ................ H04W 76/28
2020/0029302 A1* 1/2020 Cox .................... H04W 52/0229
2021/0007054 A1* 1/2021 Jiang ................... H04W 52/0235

OTHER PUBLICATIONS

Unknown, Author, "Further discussion on Wake-up signal functions", 3GPP TSG RAN WG1 Meeting #92bis, R1-1804918, Sanya, China, Apr. 16-20, 2018, pp. 1-7.
Unknown, Author, "Further discussion on WUS configurations and procedures", 3GPP TSG RAN WG1 Meeting #92bis, R1-1804919, Sanya, China, Apr. 16-20, 2018, pp. 1-8.

* cited by examiner

*Primary Examiner* — Ricardo H Castaneyra
(74) *Attorney, Agent, or Firm* — Murphy, Bilak & Homiller, PLLC

(57) ABSTRACT

A wireless device (14) is configured for use in a wireless communication network (10). The wireless device (14) is configured to transmit, to a network node in the wireless communication network (10), signaling (20) indicating a minimum period (20B) that the wireless device (14) requires between the end of a wake-up signal (18) and the start of a paging occasion (28) in order for the wireless device (14) to be able to receive a paging message in that paging occasion (28). The wireless device (14) may also be configured to receive, from a radio network node (12), signaling (34) indicating a maximum period that the radio network node (12) supports between the end of a wake-up signal (18) and the start of a paging occasion (28).

16 Claims, 28 Drawing Sheets

SUPPORT FOR A WIRELESS DEVICE WITH A WAKE-UP RECEIVER

RELATED APPLICATIONS

This application claims priority from US Provisional Application 62/667,660 filed on Mar. 7, 2018.

TECHNICAL FIELD

The present invention generally relates to a wireless device, and more particularly to support for a wireless device with a wake-up receiver.

BACKGROUND

A wireless device in a wireless communication network is typically configured to operate in a discontinuous reception (DRX) mode after a period of inactivity. In DRX mode, the wireless device is configured to receive information from the network only discontinuously in time. This relieves the wireless device from having to continuously monitor a downlink control channel (e.g., a physical downlink control channel, PDCCH) for downlink control information, including for instance paging messages intended for the device. Relieved from such continuous monitoring, the wireless device may operate in a sleep state when no information from the network is expected, e.g., by turning off at least some user equipment hardware/circuitry such as one or more receivers. Operating in a sleep state conserves the device's power and thereby prolongs the device's battery life.

Monitoring the downlink control channel, e.g., for paging messages, nonetheless consumes non-trivial amounts of power even when only monitored discontinuously in time.

SUMMARY

Power conservation may be realized through the use of a so-called wake-up signal. A wake-up signal is a physical signal that indicates the wireless device needs to awaken from a sleep state (or stay awaken) in order to monitor the downlink control channel, e.g., for paging messages. The decoding time for the wake-up signal may be considerably shorter than the decoding time for the downlink control channel. Accordingly, the wireless device may consume less power monitoring for a wake-up signal and may stay in the sleep state for longer.

Equipping a wireless device with a wake-up receiver enables even further power conservation. A wake-up receiver may be particularly designed and/or dedicated for receiving a wake-up signal, e.g. as a complement to another receiver of the device that is suitable for receiving the downlink control channel. A wake-up receiver may for instance have a lower requirement analog and radio frequency (RF) circuitry, and thereby power consumption, than a receiver capable of receiving the downlink control channel. A wake-up receiver therefore allows the wireless device to switch off one or more other receivers entirely until needed for decoding the control channel, so as to reach extremely low power consumption during sleep.

Some embodiments herein introduce signalling between a wireless device and a wireless communication network concerning the wireless device's wake-up receiver capability and/or the network's wake-up receiver capability/support. The network according to some embodiments schedules paging message(s) to the wireless device based on this signalling. The network may for instance delay transmitting paging message(s) to a wireless device with wake-up receiver capability (for longer than a device without wake-up receiver capability), to give the device time to awaken from a deep sleep state after detecting a wake-up signal with its wake-up receiver. Selectively giving a device with wake-up receiver capability extra time to awaken from a deep sleep state in this way proves advantageous in that it enables such a device to fully exploit the deep sleep state for maximum power conservation while still ensuring paging message delivery to the device. Moreover, some embodiments condition giving a device extra time to awaken from a deep sleep state on the network's ability to support that extra time, e.g., in order to safeguard latency demands placed on the network for inter-node signalling.

More particularly, embodiments herein include a method performed by a wireless device configured for use in a wireless communication network. The method comprises transmitting, to a network node in the wireless communication network, signaling indicating a minimum period that the wireless device requires between the end of a wake-up signal and the start of a paging occasion in order for the wireless device to be able to receive a paging message in that paging occasion. The method in some embodiments further comprises receiving, from a radio network node, signaling indicating a maximum period that the radio network node supports between the end of a wake-up signal and the start of a paging occasion.

In some embodiments, the method further comprises receiving a wake-up signal; and responsive to receiving the wake-up signal, monitoring for a paging message during a paging occasion that starts after at least the minimum period has passed since an end of the wake-up signal. In one such embodiment, the method may further comprise refraining from monitoring one or more other paging occasions that occur between the end of the received wake-up signal and the start of the paging occasion during which the wireless device monitors for a paging message. In other embodiments, the paging occasion is the first paging occasion that occurs within a paging transmission window for the wireless device, in which case the paging transmission window starts at least the minimum period since an end of the wake-up signal.

Alternatively or additionally, the minimum period indicated by the received signaling may be less than or equal to the maximum period supported by the radio network node. In this case, receiving the wake-up signal may comprise receiving the wake-up signal using a wake-up receiver. The method may then further comprise, responsive to receiving the wake-up signal, awakening the wireless device from a sleep state. This awakening may include activating one or more other receivers of the wireless device. Accordingly, monitoring may comprise, after awakening the wireless device from the sleep state, using the one or more other receivers to monitor for a paging message during a paging occasion that starts after at least the minimum period since an end of the wake-up signal.

In some embodiments, the indicated minimum period is a first wake-up period over which the wireless device is capable of awakening from a first sleep state. In this case, the method may further comprise, responsive to inactivity, determining whether or not to enter the first sleep state depending respectively on whether or not the first wake-up period is less than or equal to the maximum period supported by the radio network node. In the first sleep state, the wireless device is configured to monitor for a wake-up signal using a wake-up receiver. In one such embodiment, the method may further comprise, responsive to determining not to enter the first sleep state, entering a second sleep state, wherein the wireless device is configured to awaken from the second sleep state over a second wake-up period that is shorter in duration than the first wake-up period. The method may also comprise, in the second sleep state, monitoring for a wake-up signal using one or more other receivers that are different than the wake-up receiver.

In some embodiments, the wireless device has a wake-up receiver and one or more other receivers. The method in this case may further comprise monitoring for a wake-up signal using the wake-up receiver or the one or more other receivers, depending respectively on whether or not the indicated minimum period is less than the maximum period supported by the radio network node.

In some embodiments, the network node is core network node, wherein the core network node is a mobility management entity, MME, or implements an access and mobility function, AMF.

Embodiments herein also include a method performed by a radio network node configured for use in a wireless communication network. The method comprises receiving signaling indicating a minimum period that a wireless device requires between the end of a wake-up signal and the start of a paging occasion in order for the wireless device to be able to receive a paging message in that paging occasion. The method may also comprise transmitting to the wireless device signalling indicating a maximum period that the radio network node supports between the end of a wake-up signal and the start of a paging occasion.

In some embodiments, the method further comprises scheduling one or more paging messages to be transmitted to the wireless device, based on the received signalling and on whether the minimum period indicated by the received signaling is less than or equal to the maximum period supported by the radio network node. The method may then comprise transmitting the one or more paging messages as scheduled. In one such embodiment, scheduling comprises scheduling the one or more paging messages to be transmitted to the wireless device relatively later or earlier in time depending respectively on whether or not the period indicated by the received signaling is less than or equal to the maximum period supported by the radio network node, such that the one or more paging messages are transmitted later in time if the period indicated by the received signaling is less than or equal to the maximum period supported by the radio network node.

In some embodiments, the method comprises receiving a paging message from a network node in the wireless communication system. The paging message may be included the received signalling.

In some embodiments, the network node is core network node, wherein the core network node is a mobility management entity, MME, or implements an access and mobility function, AMF.

In some embodiments, the minimum period indicated by the received signaling is less than or equal to the maximum period supported by the radio network node. In this case, the method may further comprise transmitting a wake-up signal to the wireless device; and transmitting, to the wireless device, one or more paging messages during one or more paging occasions that each start after at least the minimum period has passed since an end of the wake-up signal.

Embodiments also include corresponding apparatus, computer programs, and computer-readable storage mediums. For example, embodiments include a wireless device configured for use in a wireless communication network. The wireless device is configured (e.g., via communication circuitry and processing circuitry) to transmit, to a network node in the wireless communication network, signaling indicating a minimum period that the wireless device requires between the end of a wake-up signal and the start of a paging occasion in order for the wireless device to be able to receive a paging message in that paging occasion. The wireless device in some embodiments is further configured to receive, from a radio network node, signaling indicating a maximum period that the radio network node supports between the end of a wake-up signal and the start of a paging occasion.

Embodiments further include a radio network node configured for use in a wireless communication network. The radio network node is configured (e.g., via communication circuitry and processing circuitry) to receive signaling indicating a minimum period that a wireless device requires between the end of a wake-up signal and the start of a paging occasion in order for the wireless device to be able to receive a paging message in that paging occasion. The radio network node may also be configured to transmit to the wireless device signalling indicating a maximum period that the radio network node supports between the end of a wake-up signal and the start of a paging occasion.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 7 is a logic flow diagram of a method performed by a network node according to some embodiments.

FIG. 8 is a logic flow diagram of a method performed by a network node according to other embodiments.

DETAILED DESCRIPTION

Figure 1:
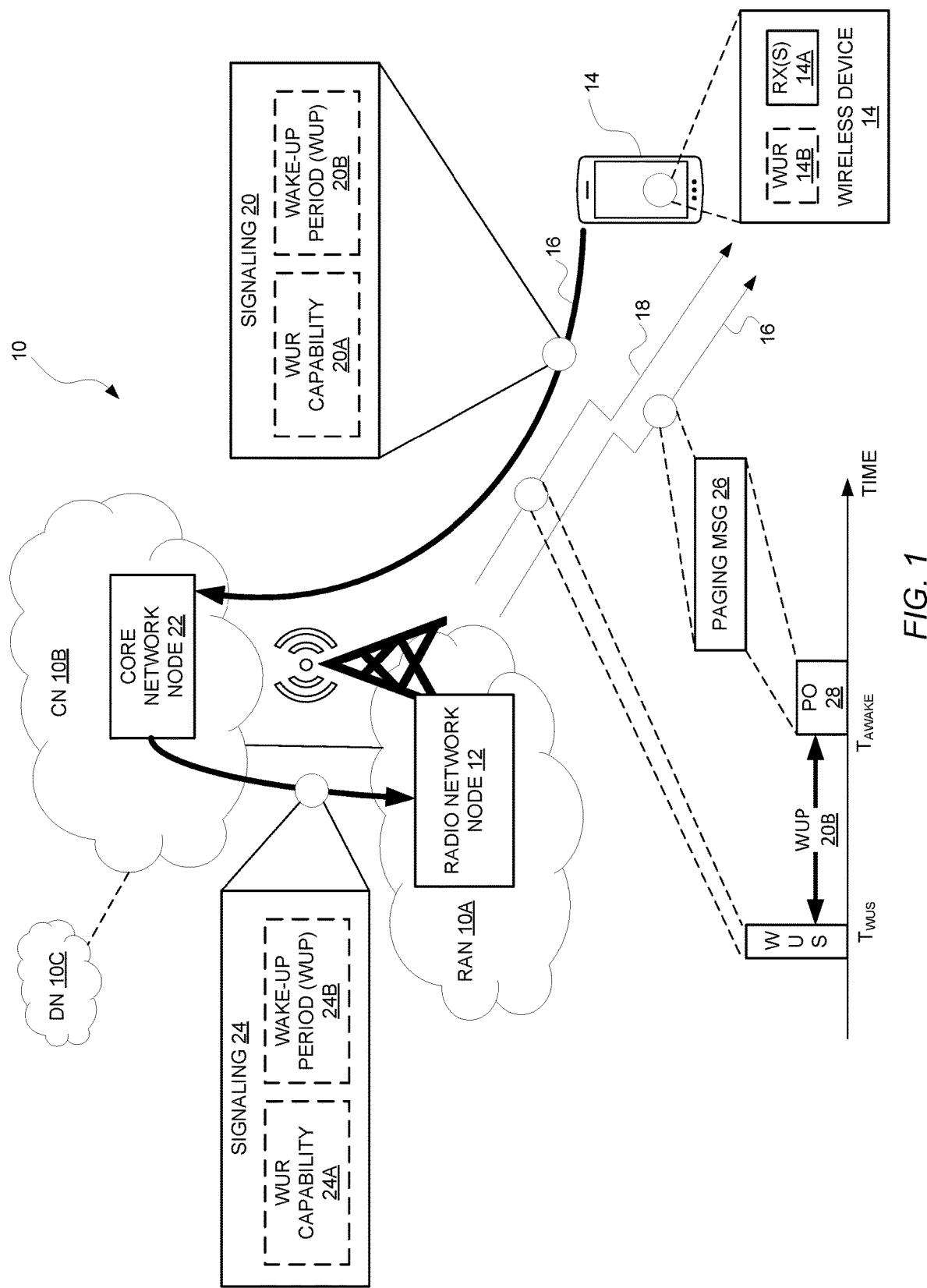
FIG. 1 is a block diagram of a wireless communication network according to some embodiments.

FIG. 1 shows a wireless communication network 10 according to some embodiments. The network 10 includes a radio network node 12 (e.g., a base station) in a radio access network (RAN) 10A portion of the network 10. The network 10 as shown also includes a wireless device 14 configured to wirelessly communicate with the radio network node 12, e.g., for connecting to a core network (CN) 10B portion of the network 10. The core network 10B may in turn connect to one or more data networks 10C (e.g., the Internet).

The wireless device 14 includes one or more receivers 14A that are configured for receiving downlink control information (e.g., paging messages) on a downlink control channel 16 from the radio network node 12. The one or more receivers 14A may also be configured for receiving user data on a downlink data channel (not shown). Regardless, the wireless device 14 does not have to continuously monitor the downlink control channel 16. Instead, the wireless device 14 may receive downlink control information on the downlink control channel 16 only discontinuously in time, e.g., according to a discontinuous reception (DRX) mode or DRX configuration of the wireless device 14. When the device 14 does not need to monitor the downlink control channel 16, the wireless device 14 is configured to operate in a sleep state in which the device at least partially de-activates some of its hardware, circuitry, and/or other power-consuming resources. For example, the device 14 may at least partially de-activate the one or more receivers 14A while sleeping in a sleep state.

The radio network node 12 is configured to awaken the wireless device 14 from a sleep state by transmitting a so-called wake-up signal (WUS) 18 to the device 14. The wake-up signal 18 is a physical signal that indicates the device 14 needs to awaken from a sleep state (or stay awaken) in order to monitor the downlink control channel 16 (e.g., for paging messages). The wake-up signal 18 may be a relatively short signal formed from an a priori known sequence that is detectable with a simple correlator.

If the wireless device 14 uses the one or more receivers 14A to also monitor for the wake-up signal 18, the device 14 can only partially de-activate those one or more receivers 14A while sleeping. Indeed, at least some portion of the one or more receivers 14A (e.g., correlation and/or synchronization circuitry) can remain active in order to detect the wake-up signal 18.

FIG. 1 however shows that the wireless device 14 may be equipped with a so called wake-up receiver (WUR) 14B for receiving the wake-up signal 18. The wake-up receiver 14B may be particularly designed and/or dedicated for receiving the wake-up signal 18, e.g. as a complement to the one or more other receivers 14A suitable for receiving the downlink control channel 16. The wake-up receiver 14B may for instance comprise a correlator configured to compare a received signal with an a priori known sequence. The wake-up receiver 14B however in some cases may also provide synchronization functionality (e.g., via detecting synchronization sequences), which may enable the device 14 to detect the wake-up signal 18 more accurately. The wake-up receiver 14B in general therefore may be a receiver particularly designed and/or dedicated to detecting one or more predefined sequences (e.g., a wake-up signal sequence and possibly one or more synchronization sequences). For this and other reasons, the wake-up receiver 14B may have a lower requirement analog and radio frequency (RF) circuitry, and thereby power consumption, than the one or more receivers 14A capable of receiving the downlink control channel 16.

If equipped with a wake-up receiver 14B, the wireless device 14 can fully de activate the one or more other receivers 14A while sleeping; that is, until the wake-up receiver 14B detects a wake-up signal 18 indicating the one or more other receivers 14A will be needed for decoding the downlink control channel 16. Complete de-activation of the one or more receivers 14A, and/or full or partial de activation of other device resources for which the wake-up receiver 14B substitutes enables the device 14 to reach a "deeper" sleep and thereby greater power savings than possible without the wake-up receiver 14B.

However, a wireless device with wake-up receiver capability may take longer to awaken than a wireless device without wake-up receiver capability. This longer wake time may be attributable for instance to the wake-up receiver capable device having to activate more receiver circuitry and/or to switch to using the one or more other receivers 14A. Regardless, the longer wake time threatens the ability of the wireless device to wake up in time to receive the downlink control channel. Indeed, if the time period between when the wireless device receives the wake-up signal 18 and when the wireless device needs to monitor the downlink control channel for a paging message is shorter than the time period it takes for the wireless device to awaken upon receiving the wake-up signal 18, the wireless device will not be awake in time to receive the paging message. So, scheduling a paging message on the downlink control channel without accounting for the longer time a wireless device with wake-up receiver capability may need to awaken risks the wireless device missing the paging message.

To address this and other challenges with wake-up receivers, some embodiments herein introduce signalling between a wireless device and a wireless communication network indicating or otherwise concerning the wireless device's wake-up receiver capability. FIG. 1 for example shows that the wireless device 14 transmits signalling 20 to a network node in the network 10, e.g., to a core network node 22 in the CN 10B via the radio network node 12 as shown. The signaling 20 in some embodiments includes information 20A indicating whether the wireless device 14 has a wake-up receiver 14B for receiving a wake-up signal 18. In this case, then, the signaling 20A generally indicates whether or not the device 14 has wake-up receiver capability. Alternatively or additionally, the signaling 20 in some embodiments indicates a wake-up period 20B over which the wireless device 14 is capable of awakening from a sleep state; namely, a sleep state during which the wireless device 14 uses a wake-up receiver 14B for receiving a wake-up signal 18. The wake-up period 20B thereby represents the minimum duration that the wireless device 14 requires between the wake-up signal 18 and any paging message, in order for the wireless device 14 to awaken in time to receive that paging message. Note, here, that the wake-up period 20B signaled by a wireless device 14 with wake-up receiver capability (e.g., 1000 ms or 2000 ms) may be longer than a wake-up period signaled by a wireless device without wake-up receiver capability (e.g., 40 ms, 80 ms, 160 ms, or 240 ms). In this case, wake-up receiver capability may be effectively indicated or inferred from the wake-up period signaled. In still other embodiments, though, the wake-up period 20B of a wireless device with wake-up receiver capability is predefined and/or determinable from other information signaled (e.g., a class or type of the wireless device 14, where different classes or types of wireless devices are predefined as having different respective wake-up periods). In these embodiments, then, the wake-up period 20B may not need to be explicitly signaled.

No matter the particular nature of the signalling 20, the network 10 according to some embodiments schedules paging message(s) to the wireless device 14 based on the signalling 20. The network 10 may do so in such a way that it enables the device 14 to fully exploit sleep for maximum power conservation while still ensuring paging message delivery to the device 14.

As shown in FIG. 1, for example, the core network node 22 receives the signaling 20 from the wireless device 14. The core network node 22 may for instance receive the signaling 20 during a procedure or message for the wireless device 14 to attach to the network 10 (e.g., within an initial ATTACH request message). In one embodiment, the core network node 22 is a mobility management entity (MME) (e.g., where the network 10 is a Long Term Evolution, LTE, network) or a network node that implements an access and mobility function (AMF) (e.g., where the network 10 is a New Radio or 5G network). Regardless, the core network node 22 may keep the information indicated by the signaling 20 as part of a container or context of information maintained by the core network node 22 about the device 14.

At some point after reception of the signaling 20, such as when the device 14 needs to be paged, the core network node 22 in turn transmits the signaling 20 to the radio network node 12 in the form of signaling 24. The signaling 24 to the radio network node 12 therefore effectively relays or forwards the signaling 20 that the core network node 22 received from the wireless device 14. In one embodiment, for instance, the core network node 22 transmits the signaling 24 within a paging message to the radio network node 12, e.g., when the wireless device 14 needs to be paged.

The radio network node 12 in some embodiments schedules one or more paging messages to be transmitted to the wireless device 14, based on the received signalling 24; that is, based on whether the wireless device 14 has a wake-up receiver and/or on the wireless device's wake-up period 20B. For example, the radio network node 12 in some embodiments schedules a paging message to a wireless device 14 that has a wake-up receiver 14B, based on the signalling 24, so that the paging message will be transmitted to the device 14 only after the device 14 has awaken from sleep.

FIG. 1 for example shows that the radio network node 12 transmits a wake-up signal 18 to the wireless device 14. In the case that the wireless device 14 has a wake-up receiver 14B and receives the wake-up signal at time TWUS, the device 14 will awaken from a sleep state over a wake-up period 20B that ends at time TAWAKE. Based on knowledge of this from the signalling 24 received, the radio network node 12 schedules a paging message (msg) 26 so that the paging message 26 will be transmitted to the device 14 within a paging occasion (PO) 28 that occurs after the wake-up period 20B. The wake-up period 20B signalled by the wireless device 14 therefore represents the minimum period that the wireless device 14 requires between the end of the wake-up signal 18 and the start of the PO 28, in order for the wireless device 14 to be able to receive a paging message in that PO 28. As shown in FIG. 1, for instance, the paging occasion 28 starts at time TAWAKE, at which point the wireless device 14 has awaken.

Scheduling a paging message in this way may involve delaying a paging message to a device with wake-up receiver capability for longer than any delay in paging message transmission to a device without wake-up receiver capability. The paging message may be delayed as needed for instance to account for a device with wake-up receiver capability taking longer to awaken from sleep than a device without wake-up receiver capability.

Figure 2A:
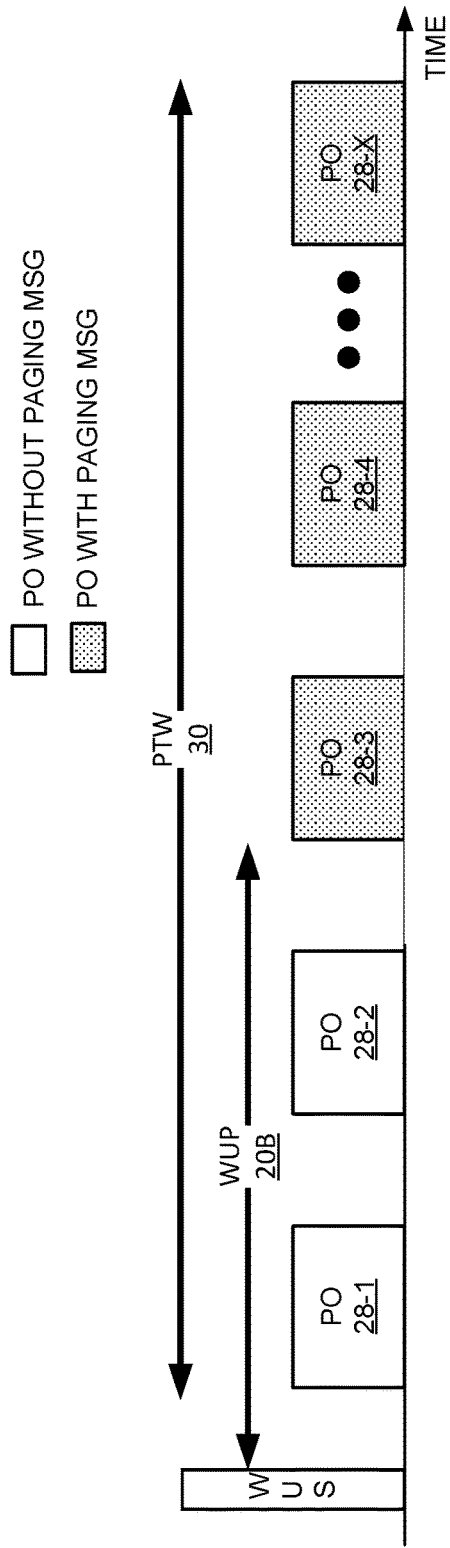
FIG. 2A is a block diagram of paging in paging occasions that account for a wake-up period of a wireless device according to some embodiments.
Figure 2B:
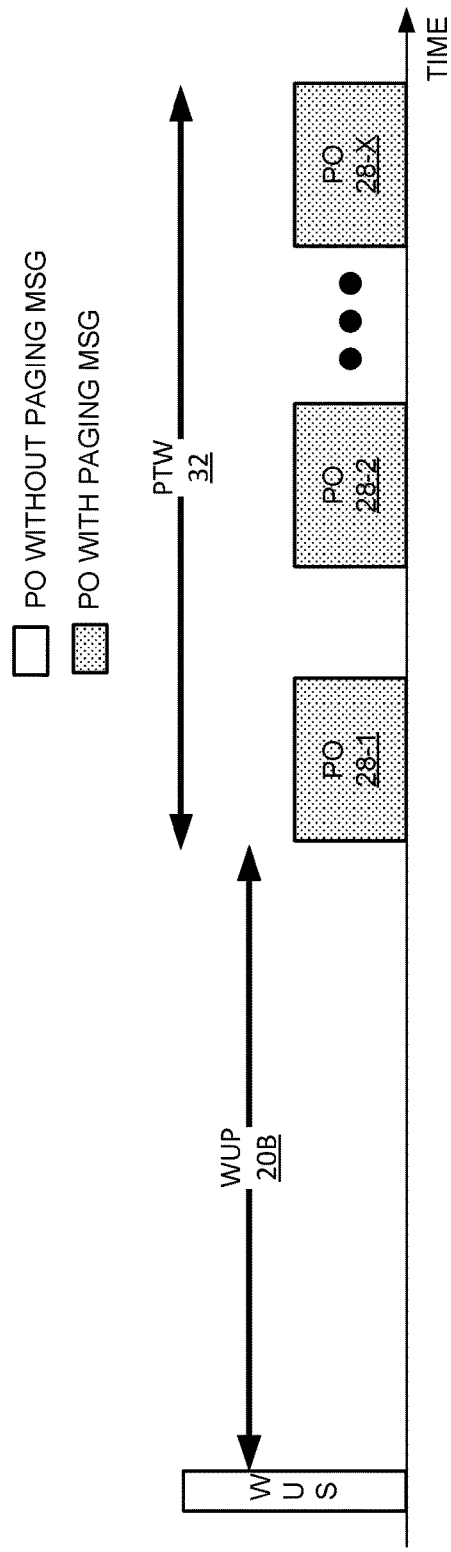
FIG. 2B is a block diagram of paging with a paging transmission window that accounts for a wake-up period of a wireless device according to some embodiments.

FIGS. 2A-2B illustrate different embodiments for scheduling a paging message to a device with wake-up receiver capability. As shown in FIG. 2A, the radio network node 12 configures the wireless device 14 with a paging transmission window (PTW) 30 that includes paging occasions 28-1, 28-2, . . . 28-X (e.g., according to a certain DRX configuration). The radio network node 12 does so without regard to whether the device has a wake-up receiver 14B. The radio network node 12 may for instance configure the wireless device 14 with these paging occasions before receiving signalling 24 from the core network node 22 indicating such capability, e.g., before any paging message needs to be transmitted.

If the wireless device 14 does not have wake-up receiver capability as determined later, the radio network node 12 may schedule paging messages to be transmitted to the wireless device 14 starting in the first paging occasion 28-1 of the PTW 30 and recurring in each subsequent paging occasion 28-2, 28-3, etc. As shown in FIG. 2A, though, if the wireless device 14 does have wake-up receiver capability, the radio network node 12 schedules paging messages to be transmitted to the wireless device 14 later in time; namely, only in the paging occasions 28-3, 28-4, . . . 28-X that occur after the device's wake-up period (WUP) 20B. The radio network node 12 thereby refrains from scheduling any paging message to the device 14 in paging occasions 28-1 and 28-2 that occur during the wake-up period 20B after transmission/reception of the wake-up signal (WUS), and instead schedules paging message(s) to be transmitted during paging occasion(s) that occur after the wake-up period 20B. This avoids unnecessary paging message transmission that the device 14 would not have been awake to receive anyway, which in turn may reduce system interference and/or improve radio network node power conservation. Similarly, the wireless device 14 in some embodiments is configured to refrain from monitoring paging occasion(s) 28-1 and 28-2 that occur during the wake-up period 20B, which may in turn improve the device's power conservation.

In other embodiments as shown in FIG. 2B, the radio network node 12 configures the wireless device 14 with a paging transmission window (PTW) that accounts for whether the device 14 has a wake-up receiver 14B. The radio network node 12 may for instance configure the wireless device 14 with the PTW after receiving signalling 24 from the core network node 22 indicating such capability. Regardless, if the wireless device 14 has wake-up receiver capability, the radio network node 12 may configure the PTW to start later than if the wireless device 14 does not have wake-up receiver capability. That is, the radio network node 12 may delay the start of the PTW to give a device with wake-up receiver capability extra time to awaken, e.g., from a deeper sleep state.

For example, as shown in FIG. 2B, if the wireless device 14 has wake-up receiver capability, the radio network node 12 configures the device 14 with a PTW 32 that starts after the device's wake-up period 20B. The radio network node 12 then schedules paging messages to be transmitted to the wireless device 14 starting in the first paging occasion 28-1 of the PTW 32 and possible recurring in each subsequent paging occasion 28-2, 28-3, etc. By shifting the PTW 32 in this way, the radio network node 12 thereby effectively refrains from scheduling any paging message to the device 14 before the wake-up period 20B. Again, this avoids unnecessary paging message transmission that the device 14 would not have been awake to receive anyway, which in turn may reduce system interference and/or improve radio network node power conservation.

No matter the particular implementation, giving a device with wake-up receiver capability extra time to awaken from the "deep" sleep associated with wake-up receiver use proves advantageous in that it enables such a device to fully exploit that deep sleep for maximum power conservation while still ensuring paging message delivery to the device. Indeed, armed with knowledge that the network 10 will delay paging message transmission to accommodate the longer wake period needed to emerge from deep sleep, the device can aggressively utilize its wake-up receiver to realize the full power-saving potential of deep sleep, rather than timidly using its wake-up receiver only under certain circumstances.

Some embodiments nonetheless condition giving a device extra time to awaken from deep sleep on the network's ability to support that extra time, e.g., in order to safeguard latency demands placed on the network 10 for inter-node signalling. In one embodiment, for instance, the radio network node 12 and the wireless device 14 effectively negotiate, agree on, or otherwise reach an understanding on whether the wireless device 14 will use its wake-up receiver 14B and enter its associated ("deep") sleep state, based on whether the wake-up period 20B that the device 14 will need to emerge from the sleep state is less than or equal to a maximum wake-up period that the radio network node 12 supports. If the wake-up period 20B is greater than the maximum wake-up period supported, the device 14 may refrain from using its wake-up receiver 14B and/or enter a different (e.g., lighter) sleep state that takes less time to emerge from.

Figure 3:
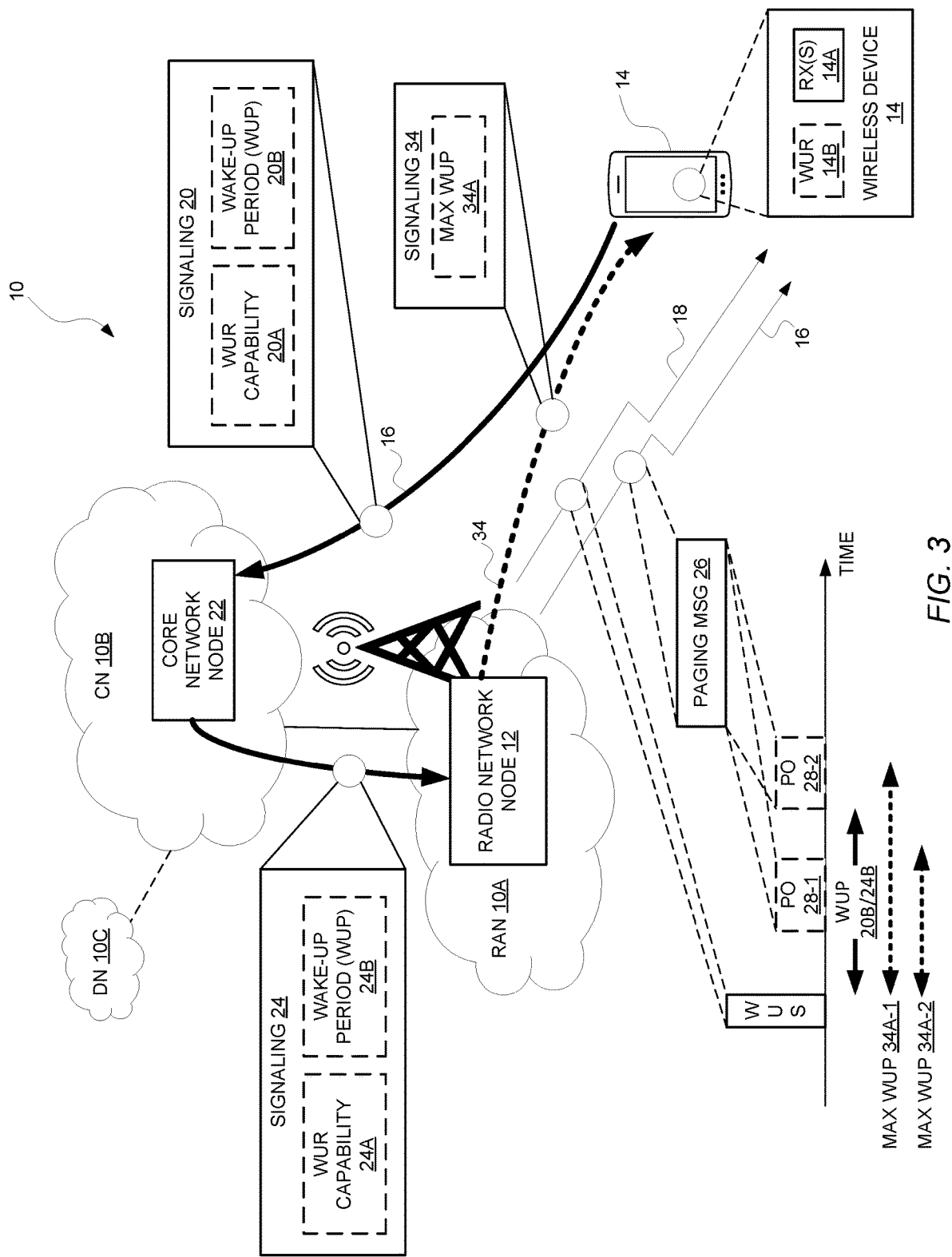
FIG. 3 is a block diagram of a wireless communication network according to other embodiments.

FIG. 3 illustrates some embodiments in this regard. As shown, the radio network node 12 transmits signalling 34 to the wireless device 14 indicating a maximum wake-up period (WUP) 34A that the radio network node 12 supports. This maximum WUP 34A may for example be determined or otherwise be based on a maximum delay supported for signalling between the radio network node 12 and the core network node 22. In some embodiments, the signalling 34 indicates the maximum WUP 34A in terms of a number M of POs, e.g., that the radio network node 12 allows the wireless device 14 to skip or refrain from monitoring for a paging message 26. The maximum WUP 34A in this case may be determined as the number M of POs multiplied by a DRX cycle length used by the device 14 (which may be device-specific or common to a cell serving the device 14).

With knowledge of the maximum WUP 34A supported by the radio network node 12, the wireless device 14 in some embodiments compares the maximum WUP 34A supported and the WUP 20B over which the device 14 needs or is capable of awakening from a (deep) sleep state within which the device 14 uses its WUR 14B. If the device's WUP 20B is less than or equal to the maximum WUP 34A supported, the device 14 may determine that it will enter that (deep) sleep state when the time to sleep arises (e.g., responsive to inactivity). But if the device's WUP 20B is greater than the maximum WUP 34A supported, the device 14 will not enter that (deep) sleep state. Instead, the device 14 in some embodiments may determine to enter a different (e.g., lighter) sleep state that has a shorter wake-up period. This different sleep state may for instance use the one or more receivers 14A rather than the WUR 14B for monitoring for and receiving the WUS 18. Generally, then, the device 14 may enter a first sleep state (e.g., a deep sleep state) or a second sleep state (e.g., a lighter sleep state) depending respectively on whether or not a first WUP 20B over which the device 14 is capable of awakening from the first sleep state is less than or equal to the maximum WUP 34A supported, with the first WUP 20B being longer than a second WUP over which the device 14 is capable of awakening from the second sleep state. And the device 14 may correspondingly monitor for the WUS 18 using either a WUR 14B or one or more other receivers 14A depending respectively on whether the device 14 enters the first or second sleep state.

The radio network node 12 in some embodiments likewise compares the maximum WUP 34A supported and the WUP 20B/24B of the device 14 (associated with the device's use of a WUR 14B) and schedules a paging message 26 based on that comparison. For example, the radio network node 12 in some embodiments schedules a paging message 26 to be transmitted to the device 14, based on the received signalling 24 (indicating the device's WUR capability 24A) and on whether the WUP 24B of the device 14 (associated with the device's use of a WUR 14B) is less than or equal to the maximum WUP 34A supported. The paging message 26 may be scheduled relatively later or earlier in time depending respectively on whether or not the wireless device 14 has a wake-up receiver 14B and the wake-up period 24B of the wireless device 14 is less than or equal to the maximum wake-up period 34A supported by the radio network node 12. In this case, the paging message 26 may be transmitted later in time if the wireless device 14 has a wake-up receiver 14B and the wake-up period 24B of the wireless device 14 is less than or equal to the maximum wake-up period 34A supported.

In FIG. 3, for example, if the radio network node 12 supports a maximum WUP 34A 1, the device 14 has a wake-up receiver 14B, and the device's WUP 24B is less than or equal to the maximum WUP 34A-1, the radio network node 12 schedules the paging message 26 to be transmitted within PO 28-2, which occurs after the device's WUP 24B ends. On the other hand, if the radio network node 12 only supports a maximum WUP 34A-2 which is less than the maximum WUP 34A-1 of the previous example, the device's WUP 24B as shown will be greater than the maximum WUP 34A-2. In this case, the radio network node 12 schedules the paging message 26 to be transmitted within PO 28-1, which occurs before PO 28-2 and before the device's WUP 24B ends. Scheduling the paging message 26 to be transmitted within PO 28-1 in this way may give the device 14 enough time to wake up from a different (e.g., lighter) sleep state and still receive the paging message 26.

Note that although FIG. 3's example was illustrated using signalling 20, 24, and 34, some or all of the information indicated by that signalling may be predefined or otherwise determinable without regard to such signalling. For example, in some embodiments, the maximum WUP 34A supported may be predefined or otherwise determinable by the wireless device 14, in which case no such signalling 34 may be required.

Figure 4:
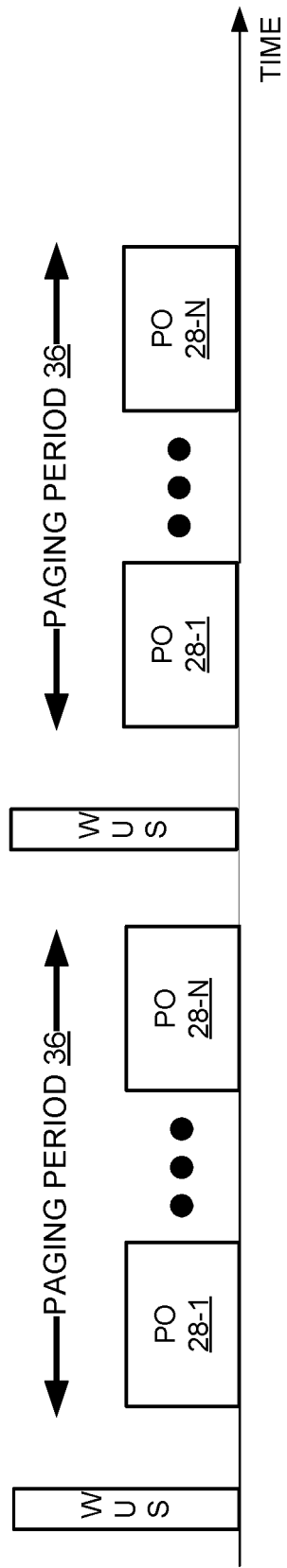
FIG. 4 is a block diagram of multiple paging periods with a wake-up signal according to some embodiments.

Note also that although the above embodiments were illustrated with respect to a single paging message 26, that paging message 26 may be just the first of multiple paging messages transmitted to the wireless device 14 after the wake-up signal 18. In fact, in some embodiments as shown in FIG. 4, a paging period 36 is defined within which one or more paging messages 26 are transmittable to the wireless device 14 after transmission of a WUS 18 to the device 14. The paging period 36 as shown for instance may be defined in terms of a number N of POs, i.e., POs 28-1, 28-2, . . . 28-N, that follow after each WUS 18. The paging period 36 in this case may define or be associated with a 1-to-N WUS-to-PO ratio. If more than one PO occurs after the device's WUP 20B, 24B, the radio network node 12 may schedule more than one repetition of the paging message 26 to be transmitted in those respective POs to the wireless device 14. This may give the wireless device 14 additional attempts at successfully receiving the paging message.

Figure 5:
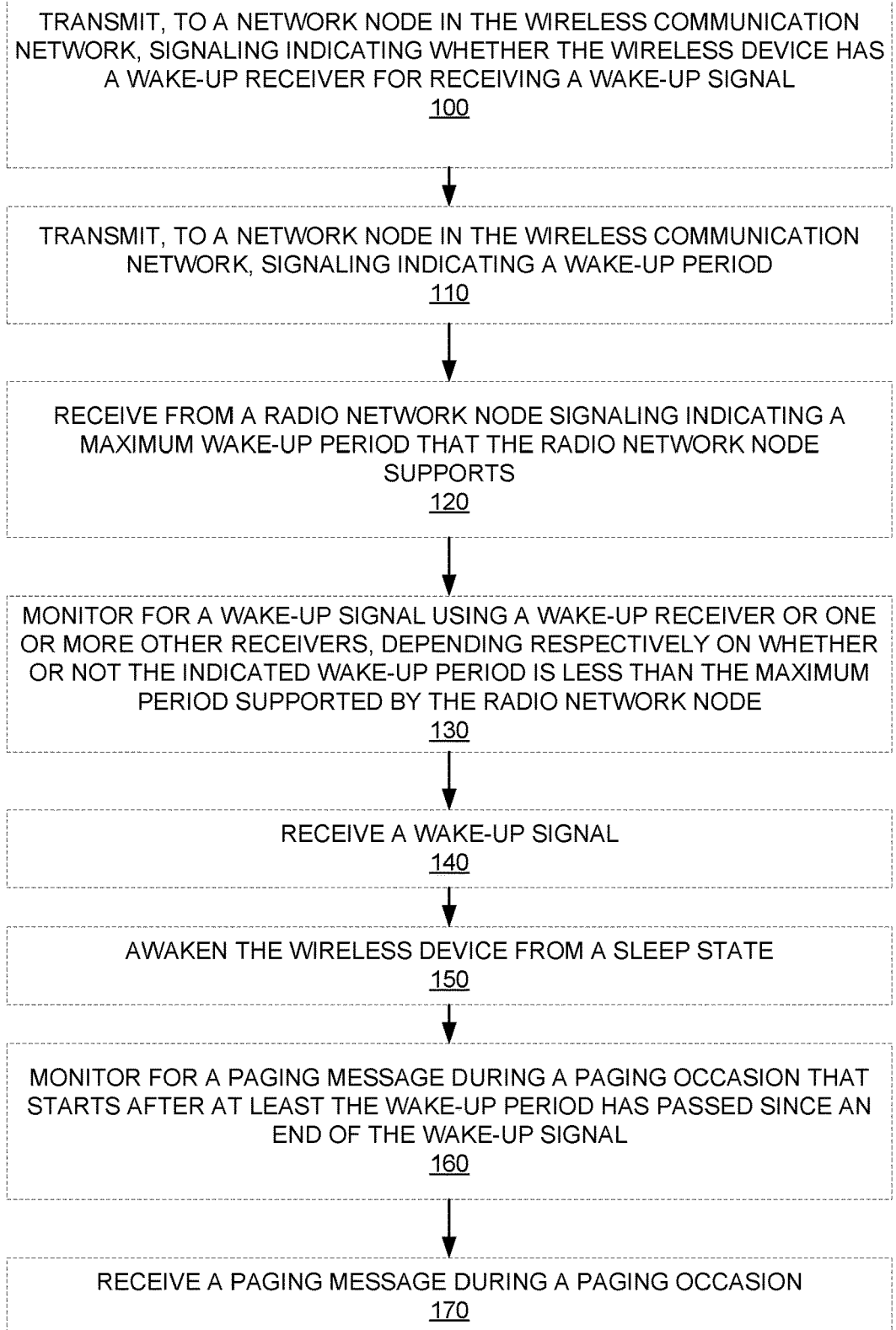
FIG. 5 is a logic flow diagram of a method performed by a wireless device according to some embodiments.

In view of the above modifications and variations, FIG. 5 depicts a method performed by a wireless device 14 in accordance with some embodiments. The method comprises transmitting, to a network node (e.g., core network node 22) in the wireless communication network 10, signaling 20 indicating whether the wireless device 14 has a wake-up receiver 14B for receiving a wake-up signal 18 (Block 100). The wake-up signal 18 in some embodiments awakens the wireless device 14 from a sleep state, e.g., a "deep" sleep state, a "light" sleep state, or any other sleep state. Alternatively or additionally, the method performed by the wireless device 14 may include transmitting, to a network node (e.g., core network node 22) in the wireless communication network 10, signaling 20 indicating a wake-up period 20B (Block 110). The wake-up period 20B may be a period over which the wireless device 14 is capable of awakening from a sleep state, e.g., a "deep" sleep state, a "light" sleep state, or any other sleep state. The wake-up period 20B in these and other embodiments may therefore represent the minimum period that the wireless device 14 requires between the end of a wake-up signal 18 and the start of a paging occasion 28 in order for the wireless device 14 to be able to receive a paging message in that paging occasion 28. Still alternatively or additionally, the method performed by the wireless device 14 may include receiving from a radio network node 12 signalling 34 indicating a maximum wake-up period 34A that the radio network node 12 supports (Block 120). In some embodiments, this signaling indicates the maximum wake-up period in terms of a number of paging occasions. In this case, the method may further comprise determining, from the received signaling, the maximum wake-up period as being the number of paging occasions multiplied by a discontinuous reception, DRX, cycle length used by the wireless device.

In some embodiments, the method may further include monitoring for a wake-up signal 18 using a wake-up receiver 14B or one or more other receivers 14A, depending respectively on whether or not the indicated wake-up period 20B is less than the maximum period 34A supported by the radio network node 12 (Block 130). The method may also include receiving a wake-up signal 18, e.g., based on the monitoring in Block 130 (Block 140). Responsive to receiving a wake-up signal 18, the method may include awakening the wireless device 14 from a sleep state (Block 150).

In some embodiments, the method may further include monitoring for a paging message during a paging occasion 28 that starts after at least the wake-up period 20B has passed since an end of the wake-up signal 18 (Block 160). The method may further include receiving a paging message during a paging message, e.g., according to the monitoring in Block 160 (Block 170).

In some embodiments where the signaling indicates that the wireless device has a wake-up receiver, the method may further comprise: receiving the wake-up signal using the wake-up receiver; responsive to receiving the wake-up signal, awakening the wireless device from a sleep state over a wake-up period, wherein said awakening includes activating one or more other receivers of the wireless device; and after awakening, using the one or more other receivers to receive a paging message during a paging occasion that occurs after the wake-up period. In one such embodiment, the method may further comprise refraining from monitoring one or more paging occasions that occur during the wake-up period. Alternatively, the paging occasion may be the first paging occasion that occurs within a paging transmission window for the wireless device, wherein the paging transmission window starts after the wake-up period.

In some embodiments, the method further comprises, responsive to inactivity, determining whether or not to enter a first sleep state depending respectively on whether or not a first wake-up period over which the wireless device is capable of awakening from the first sleep state is less than or equal to a maximum wake-up period supported by a radio network node, wherein in the first sleep state the wireless device is configured to monitor for a wake-up signal using the wake-up receiver. In one such embodiment, the method may further comprise: responsive to determining not to enter the first sleep state, determining to enter a second sleep state, wherein the wireless device is configured to awaken from the second sleep state over a second wake-up period that is shorter in time than the first wake-up period; and in the second sleep state, monitoring for a wake-up signal using one or more other receivers that are different than the wake-up receiver.

In some embodiments, the method comprises transmitting the signaling (indicaitng whether the wireless device has a wake-up receiver and/or the wake-up period) during a procedure or message for attaching to the wireless communication network.

In some embodiments, the network node is core network node, wherein the core network node is a mobility management entity, MME, or implements an access and mobility function, AMF.

In some embodiments, the method further comprises receiving signaling indicating a paging period within which one or more paging messages will be transmitted to the wireless device after transmission of a wake-up signal to the wireless device. In one embodiment, for example, the the signaling indicates the paging period in terms of a number of paging occasions. In some embodiments wherein the signaling indicates that the wireless device has a wake-up receiver, the method may further comprise: receiving the wake-up signal using the wake-up receiver; responsive to receiving the wake-up signal, awakening the wireless device from a sleep state over a wake-up period, wherein said awakening includes activating one or more other receivers of the wireless device; and after awakening, using the one or more other receivers to receive one or more paging messages during one or more paging occasions that occur after the wake-up period and during the paging period. In one such embodiment, then, the method may further comprise refraining from monitoring one or more paging occasions that occur during the wake-up period.

Figure 6:
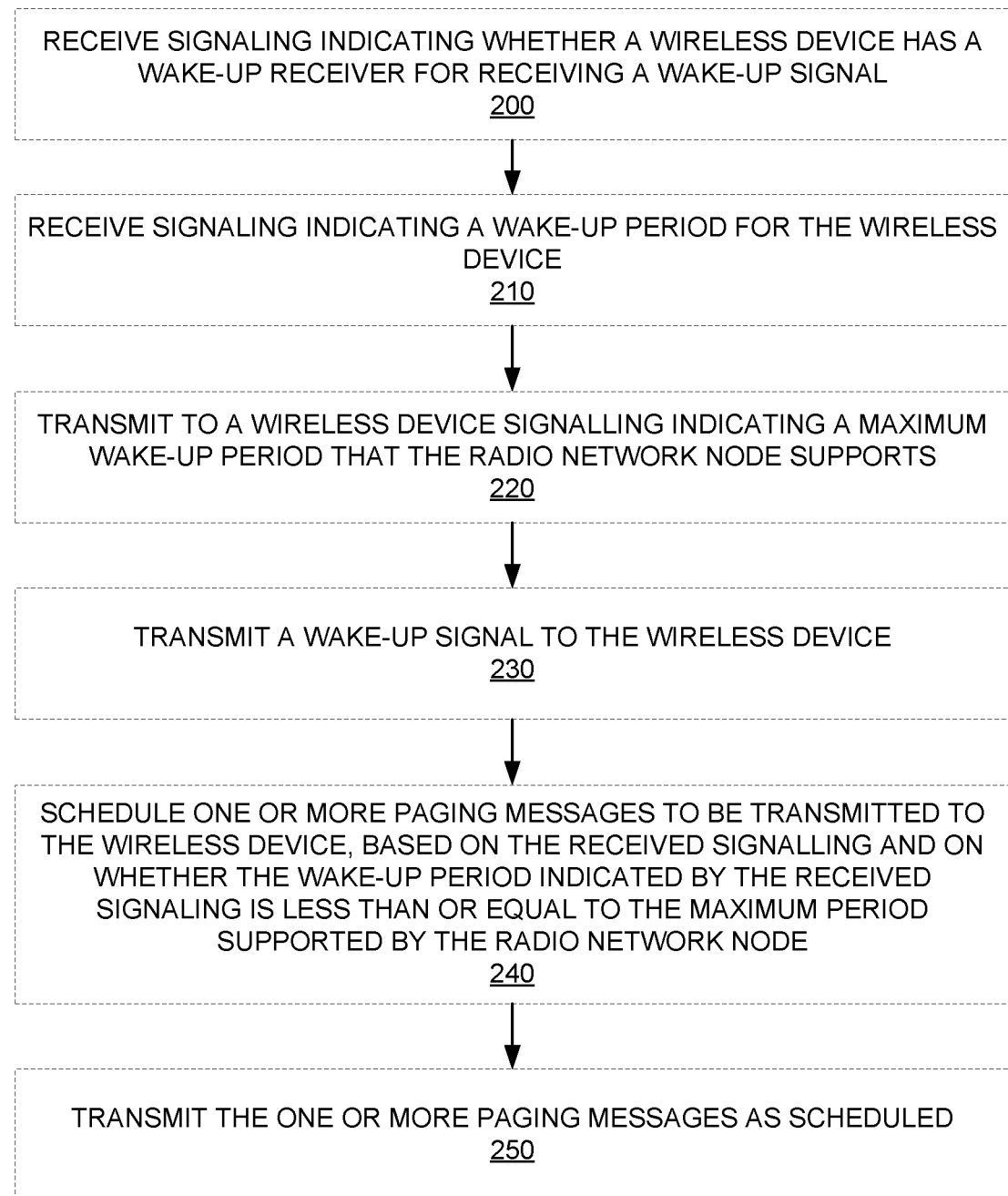
FIG. 6 is a logic flow diagram of a method performed by a radio network node according to some embodiments.

FIG. 6 depicts a method performed by a radio network node 12 in accordance with other embodiments. The method includes receiving signaling 20 or 24 indicating whether a wireless device 14 has a wake-up receiver 14B for receiving a wake-up signal 18 (Block 200). The wake-up signal 18 in some embodiments awakens the wireless device 14 from a sleep state, e.g., a "deep" sleep state, a "light" sleep state, or any other sleep state. Alternatively or additionally, the method includes receiving signaling 20 or 24 indicating a wake-up period 20B for the wireless device 14 (Block 210). The wake-up period 20B may be a period over which the wireless device 14 is capable of awakening from a sleep state, e.g., a "deep" sleep state, a "light" sleep state, or any other sleep state. The wake-up period 20B in these and other embodiments may therefore represent the minimum period that the wireless device 14 requires between the end of a wake-up signal 18 and the start of a paging occasion 28 in order for the wireless device 14 to be able to receive a paging message in that paging occasion 28. Still alternatively or additionally, the method may include transmitting to a wireless device 14 signalling 34 indicating a maximum wake-up period 34A that the radio network node 12 supports (Block 220). In some embodiments, this signaling 34 indicates the maximum wake-up period 34A in terms of a number of paging occasions.

In some embodiments, the method further includes transmitting a wake-up signal 18 to the wireless device 14 (Block 230).

The method may also include scheduling one or more paging messages to be transmitted to the wireless device 14, based on the received signalling 20, 24. In some embodiments, the scheduling may also be based on whether the wake-up period 20B indicated by the received signaling is less than or equal to the maximum period 34A supported by the radio network node 12 (Block 240). In one or more embodiments, for example, scheduling comprises refraining from scheduling any paging message to be transmitted to the wireless device in one or more paging occasions that occur during a wake-up period after transmission of the wake-up signal, and scheduling one or more paging message to be transmitted to the wireless device during one or more paging occasions that occur after the wake-up period. Alternatively, in one or more other embodiments, scheduling a paging transmission window for the wireless device to start after a wake-up period over which the wireless device is configured to awaken from a sleep state after reception of the wake-up signal, wherein the paging transmission window includes one or more paging occasions during which the radio network node is to transmit the one or more paging messages to the wireless device.

In some embodiments, the method comprises scheduling the one or more paging messages to be transmitted to the wireless device relatively later or earlier in time depending respectively on whether or not the wireless device has a wake-up receiver and the wake-up period of the wireless device is less than or equal to the maximum wake-up period supported by the radio network node, such that the one or more paging messages are transmitted later in time if the wireless device has a wake-up receiver and the wake-up period of the wireless device is less than or equal to the maximum wake-up period supported.

Regardless, the method may further include transmitting the one or more paging messages as scheduled (Block 250).

In some embodiments, the method may further comprise receiving a paging message from a network node in the wireless communication system. In this case, the received signaling 20 or 24 may be included in the paging message. In some embodiments, the network node is core network node, wherein the core network node is a mobility management entity, MME, or implements an access and mobility function, AMF.

In some embodiments, the method further comprises transmitting to the wireless device signalling indicating a paging period within which one or more paging messages will be transmitted to the wireless device after transmission of a wake-up signal to the wireless device. For example, the signaling may indicate the paging period in terms of a number of paging occasions.

In some embodiments, the method further comprises transmitting a wake-up signal to the wireless device, scheduling one or more paging messages to be transmitted to the wireless device during one or more paging occasions that occur after a wake-up period and during a paging period, and transmitting the one or more paging messages to the wireless device as scheduled. Here, the wake-up period may be a period over which the wireless device awakens from a sleep state after reception of the wake-up signal. The paging period may be a period within which one or more paging messages will be transmitted to the wireless device after transmission of a wake-up signal to the wireless device.

FIG. 7 depicts a method performed by a network node (e.g., core network node 22) in accordance with still other embodiments. The method includes receiving from a wireless device 14 signaling 20 indicating whether the wireless device 14 has a wake-up receiver 14B for receiving a wake-up signal 18 (Block 300). The wake-up signal 18 in some embodiments awakens the wireless device 14 from a sleep state, e.g., a "deep" sleep state, a "light" sleep state, or any other sleep state. In some embodiments, the signaling 20 further indicates a wake-up period 20B for the wireless device, e.g., a period over which the wireless device 14 is capable of awakening from a sleep state. Alternatively or additionally, the method includes transmitting to a radio network node 12 signaling 24 indicating whether the wireless device 14 has a wake-up receiver 14B for receiving a wake-up signal 18 (Block 310). In some embodiments, the signaling 24 further indicates a wake-up period 20B for the wireless device, e.g., a period over which the wireless device 14 is capable of awakening from a sleep state.

In some embodiments, the method further includes transmitting a paging message to the radio network node. The paging message may include the transmitted signalling 24 and/or the received signalling 20.

In some embodiments, the network node is core network node, wherein the core network node is a mobility management entity, MME, or implements an access and mobility function, AMF.

FIG. 8 shows a method performed by a network node (e.g., core network node 22) in accordance with yet other embodiments. The method includes receiving from a wireless device 14 signaling 20 indicating a wake-up period 20B (Block 400) The wake-up period 20B may be a period over which the wireless device 14 is capable of awakening from a sleep state, e.g., a "deep" sleep state, a "light" sleep state, or any other sleep state. The wake-up period 20B in these and other embodiments may therefore represent the minimum period that the wireless device 14 requires between the end of a wake-up signal 18 and the start of a paging occasion 28 in order for the wireless device 14 to be able to receive a paging message in that paging occasion 28. In some embodiments, the signalling 20 further indicates whether the wireless device 14 has a wake-up receiver for receiving a wake-up signal 18. Alternatively or additionally, the method includes transmitting to a radio network node 12 signaling 24 indicating a wake-up period 20B (Block 410). In some embodiments, the signalling 24 further indicates whether the wireless device 14 has a wake-up receiver for receiving a wake-up signal 18.

In some embodiments, the method further includes transmitting a paging message to the radio network node. The paging message may include the transmitted signalling 24 and/or the received signalling 20.

In some embodiments, the network node is core network node, wherein the core network node is a mobility management entity, MME, or implements an access and mobility function, AMF.

Figure 9:
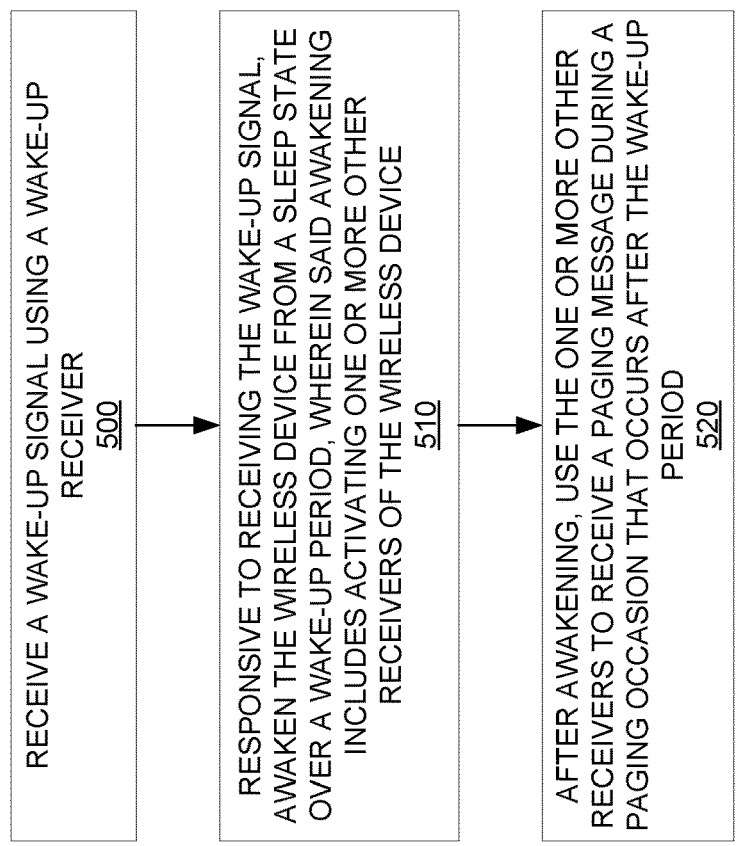
FIG. 9 is a logic flow diagram of a method performed by a wireless device according to other embodiments.

FIG. 9 depicts still another method performed by a wireless device 14 according to some embodiments. The method includes receiving a wake-up signal 18 using a wake-up receiver 14B (Block 500). The method also includes responsive to receiving the wake-up signal 18, awakening the wireless device 14 from a sleep state over a wake-up period 20B (Block 510). This awakening may include activating one or more other receivers 14A of the wireless device 14. The method also includes, after awakening, using the one or more other receivers 14A to receive a paging message 26 during a paging occasion 28 that occurs after the wake-up period 20B (Block 520).

In some embodiments, the method further comprises refraining from monitoring one or more paging occasions that occur during the wake-up period. In other embodiments, the paging occasion is the first paging occasion that occurs within a paging transmission window for the wireless device, wherein the paging transmission window starts after the wake-up period.

Figure 10:
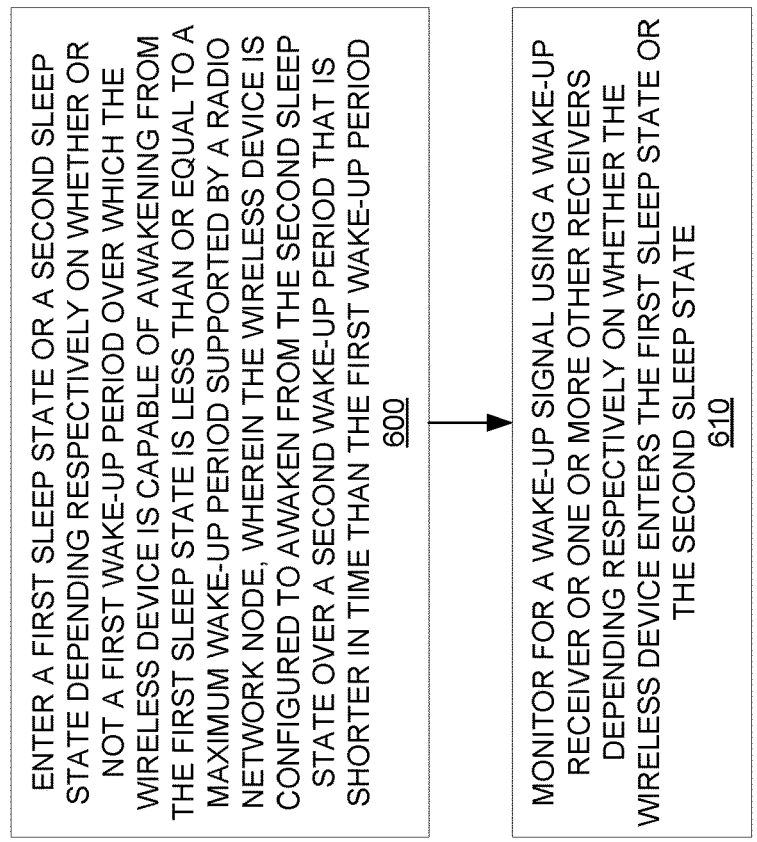
FIG. 10 is a logic flow diagram of a method performed by a wireless device according to yet other embodiments.

FIG. 10 depicts yet another method performed by a wireless device 14 according to some embodiments. The method includes entering a first sleep state or a second sleep state depending respectively on whether or not a first wake-up period 20B over which the wireless device 14 is capable of awakening from the first sleep state is less than or equal to a maximum wake-up period 34A supported by a radio network node 12 (Block 600). The wireless device 14 is configured to awaken from the second sleep state over a second wake-up period that is shorter in time than the first wake-up period 20B. The method also includes monitoring for a wake-up signal 18 using a wake-up receiver 14B or one or more other receivers 14A depending respectively on whether the wireless device 14 enters the first sleep state or the second sleep state (Block 610).

In some embodiments, the method further comprises receiving from a radio network node signaling indicating the maximum wake-up period that the radio network node supports.

In some embodiments, the method further comprises transmitting, to a network node in the wireless communication network, signaling indicating the first wake-up period and/or the second wake-up period. In one embodiment, for example, the method comprises transmitting the signaling during a procedure or message for attaching to the wireless communication network. In these and other embodiments, the network node may be core network node, wherein the core network node is a mobility management entity, MME, or implements an access and mobility function, AMF.

Figure 11:
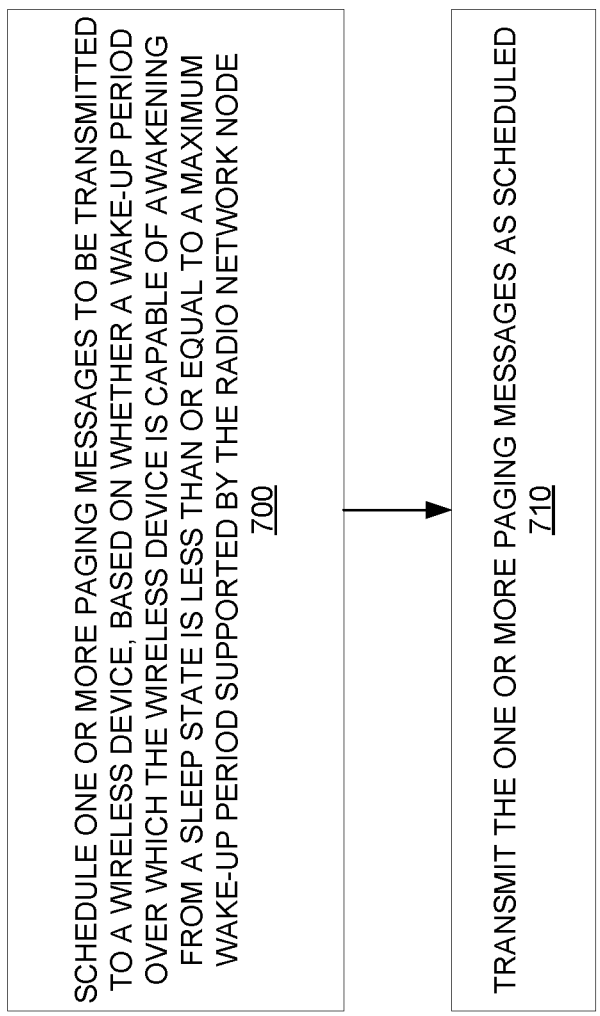
FIG. 11 is a logic flow diagram of a method performed by a radio network node according to other embodiments.

FIG. 11 illustrates a method performed by a radio network node 12 according to other embodiments. The method includes scheduling one or more paging messages 26 to be transmitted to a wireless device 14, based on whether a wake-up period 20B over which the wireless device 14 is capable of awakening from a sleep state is less than or equal to a maximum wake-up period 34A supported by the radio network node 12 (Block 700). The method as shown further includes transmitting the one or more paging messages 26 as scheduled (Block 710).

In some embodiments, said scheduling comprises scheduling the one or more paging messages to be transmitted to the wireless device relatively later or earlier in time depending respectively on whether or not the wake-up period of the wireless device is less than or equal to the maximum wake-up period supported by the radio network node, such that the one or more paging messages are transmitted later in time if the wireless device has a wake-up receiver and the wake-up period of the wireless device is less than or equal to the maximum wake-up period supported.

In some embodiments, the method further comprises transmitting a wake-up signal to the wireless device, and said scheduling comprises refraining from scheduling any paging message to be transmitted to the wireless device in one or more paging occasions that occur during the wake-up period after transmission of the wake-up signal, and scheduling one or more paging message to be transmitted to the wireless device during one or more paging occasions that occur after the wake-up period.

In other embodiments, the method further comprises transmitting a wake-up signal to the wireless device, and said scheduling comprises scheduling a paging transmission window for the wireless device to start after the wake-up period over which the wireless device is configured to awaken from a sleep state after reception of the wake-up signal, wherein the paging transmission window includes one or more paging occasions during which the radio network node is to transmit the one or more paging messages to the wireless device.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
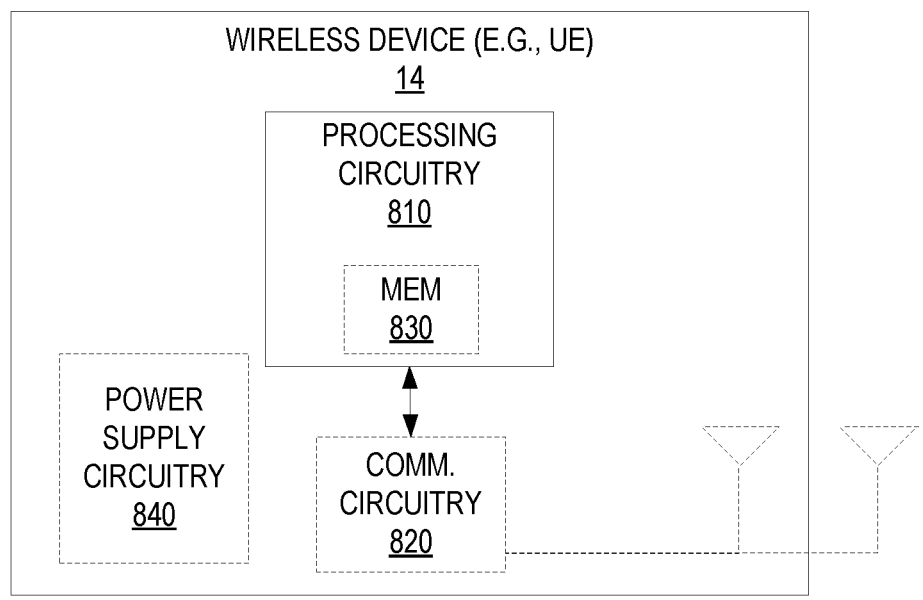
FIG. 12 is a block diagram of a wireless device according to some embodiments.

FIG. 12 for example illustrates a wireless device 14 as implemented in accordance with one or more embodiments. As shown, the wireless device 14 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 14. The communication circuitry 820 in this regard may for instance include receiver circuitry that implements the one or more receivers 14A and/or the wake-up receiver 14B of the device 14. The processing circuitry 810 is configured to perform processing described above (e.g., in FIGS. 5, 9, and/or 10), such as by executing instructions stored in memory 830. The processing circuitry 810 in this regard may implement certain functional means, units, or modules. The wireless device 14 in some embodiments also includes power supply circuitry 840 for supplying power to the wireless device 14.

Figure 13:
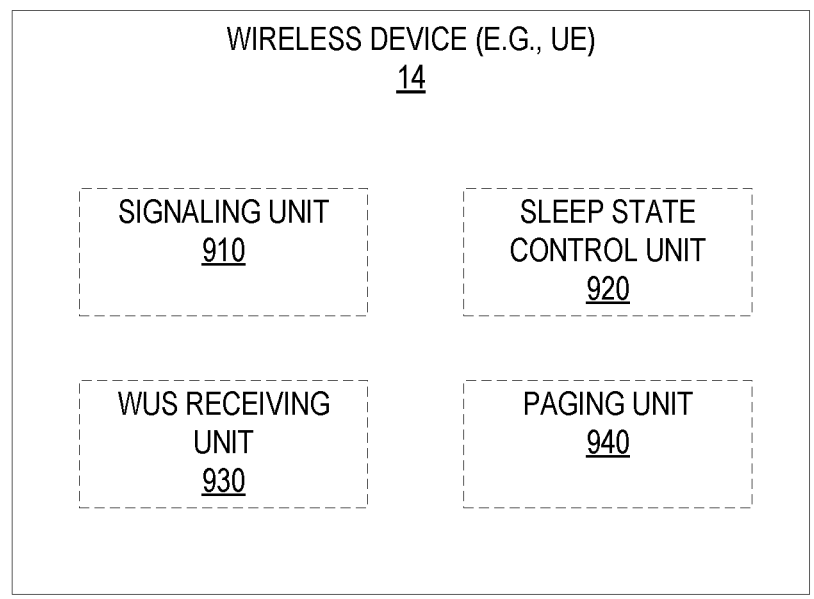
FIG. 13 is a block diagram of a wireless device according to other embodiments.
Figure 22:
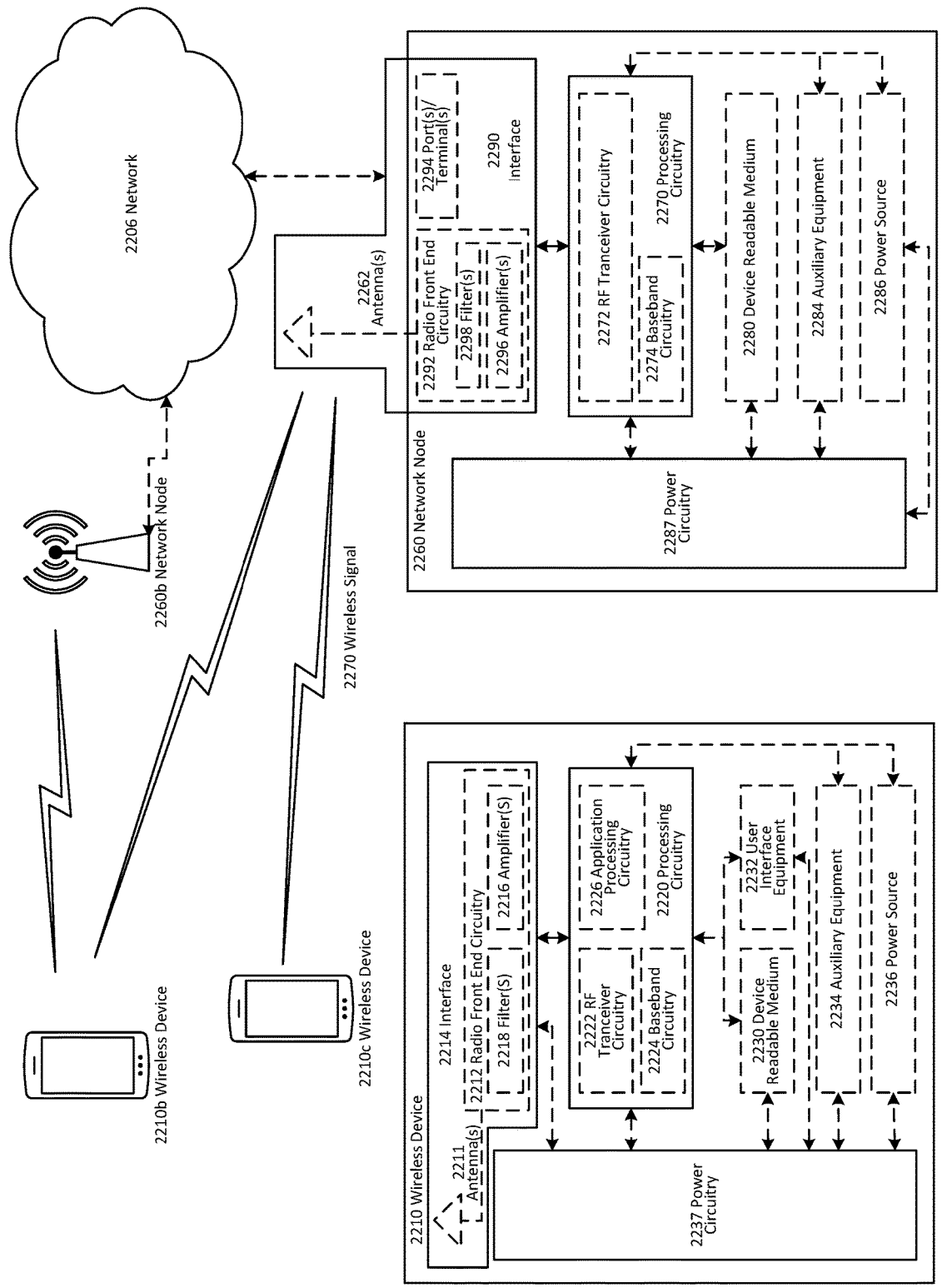
FIG. 22 is a block diagram of a wireless communication network according to some embodiments.

FIG. 13 illustrates a schematic block diagram of a wireless device 14 in a wireless network according to still other embodiments (for example, the wireless network shown in FIG. 22). As shown, the wireless device 14 implements various functional means, units, or modules, e.g., via the processing circuitry 810 in FIG. 12 and/or via software code. These functional means, units, or modules, e.g., for implementing the method(s) herein, include for instance a signalling unit or module 910 for transmitting and/or receiving the signalling 20, 34 discussed above. That is, in some embodiments the signalling unit or module 910 is for transmitting, to a network node (e.g., core network node 22) in the wireless communication network 10, signaling 20 indicating whether the wireless device 14 has a wake-up receiver 14B for receiving a wake-up signal 18 that awakens the wireless device 14 from a sleep state (e.g., a "deep" sleep state, a "light" sleep state, or any other sleep state). Alternatively or additionally, the signalling unit or module 910 may be for transmitting, to a network node (e.g., core network node 22) in the wireless communication network 10, signaling 20 indicating a wake-up period 20B over which the wireless device 14 is capable of awakening from a sleep state (e.g., a "deep" sleep state, a "light" sleep state, or any other sleep state). Still alternatively or additionally, the signalling unit or module 910 may be for receiving from a radio network node 12 signalling 34 indicating a maximum wake-up period 34A that the radio network node 12 supports.

In some embodiments, the wireless device 14 alternatively or additionally includes a WUS receiving unit or module 930 for receiving a wake-up signal using a wake-up receiver 14B. The wireless device 14 may also include a sleep state control unit or module 920 for, responsive to receiving the wake-up signal, awakening the wireless device from a sleep state over a wake-up period, wherein said awakening includes activating one or more other receivers of the wireless device. The wireless device 14 may further include a paging unit or module 940 for, after awakening, using the one or more other receivers to receive a paging message during a paging occasion that occurs after the wake-up period.

In other embodiments, the sleep state control unit or module 920 may be for entering a first sleep state or a second sleep state depending respectively on whether or not a first wake-up period over which the wireless device is capable of awakening from the first sleep state is less than or equal to a maximum wake-up period supported by a radio network node, wherein the wireless device is configured to awaken from the second sleep state over a second wake-up period that is shorter in time than the first wake-up period. In this case, the WUS receiving unit or module 930 may be for monitoring for a wake-up signal using a wake-up receiver or one or more other receivers depending respectively on whether the wireless device enters the first sleep state or the second sleep state.

Figure 14:
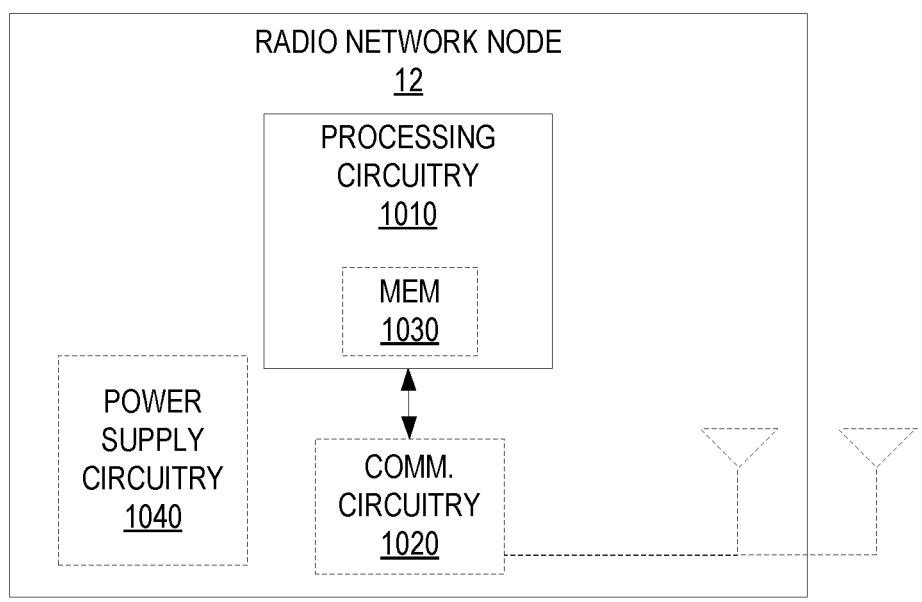
FIG. 14 is a block diagram of a radio network node according to some embodiments.

FIG. 14 illustrates a radio network node 12 as implemented in accordance with one or more embodiments. As shown, the radio network node 12 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above (e.g., in FIGS. 6 and/or 11), such as by executing instructions stored in memory 1030. The processing circuitry 1010 in this regard may implement certain functional means, units, or modules. The radio network node 12 in some embodiments also includes power supply circuitry 1040 for supplying power to the radio network node 12.

Figure 15:
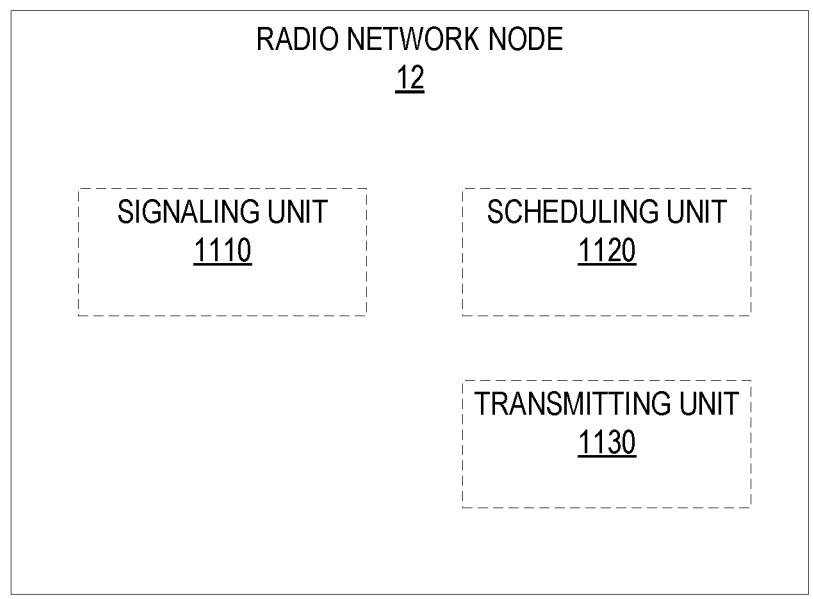
FIG. 15 is a block diagram of a radio network node according to other embodiments.

FIG. 15 illustrates a schematic block diagram of a radio network node 12 in a wireless network according to still other embodiments (for example, the wireless network shown in FIG. 22). As shown, the radio network node 12 implements various functional means, units, or modules, e.g., via the processing circuitry 1010 in FIG. 14 and/or via software code. These functional means, units, or modules, e.g., for implementing the method(s) herein, include for instance a signalling unit or module 1110 for transmitting and/or receiving the signalling 20, 24, and/or 34 described herein. That is, the signalling unit or module 1110 may be for receiving signaling 20 or 24 indicating whether a wireless device 14 has a wake-up receiver 14B for receiving a wake-up signal 18 that awakens the wireless device 14 from a sleep state (e.g., a "deep" sleep state, a "light" sleep state, or any other sleep state). Alternatively or additionally, the signalling unit or module 1110 may be for receiving signaling 20 or 24 indicating a wake-up period 20B over which the wireless device 14 is capable of awakening from a sleep state (e.g., a "deep" sleep state, a "light" sleep state, or any other sleep state). Still alternatively or additionally, the signalling unit or module 1110 may be for transmitting to a wireless device 14 signalling 34 indicating a maximum wake-up period 34A that the radio network node 12 supports.

In some embodiments, the radio network node 12 alternatively or additionally includes a scheduling unit or module 1120 for scheduling one or more paging messages 26 to be transmitted to a wireless device 14, based on whether a wake-up period 20B over which the wireless device 14 is capable of awakening from a sleep state is less than or equal to a maximum wake-up period 34A supported by the radio network node 12. The radio network node 12 may further includes a transmitting unit or module 1130 for transmitting the one or more paging messages 26 as scheduled.

Figure 16:
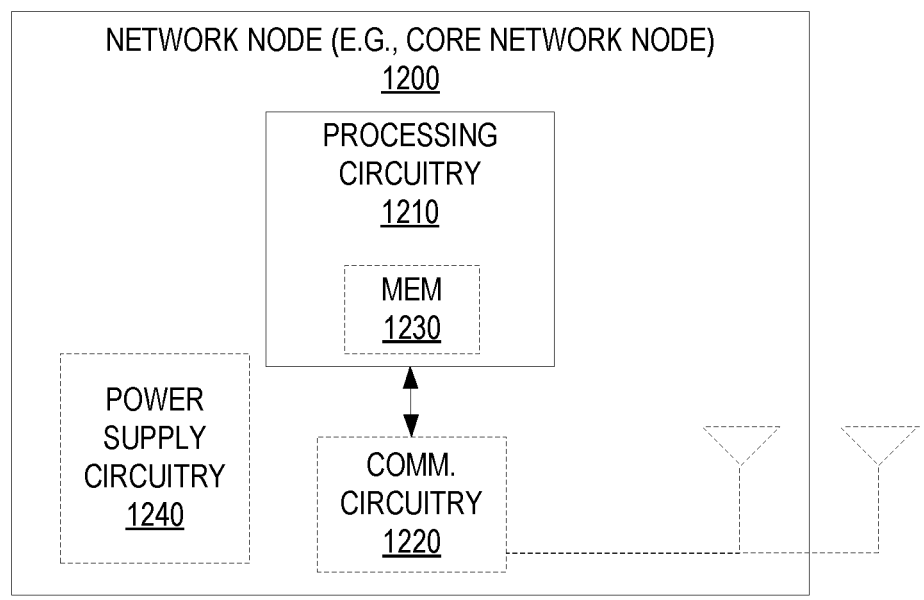
FIG. 16 is a block diagram of a network node according to some embodiments.

FIG. 16 illustrates a network node 1200 (e.g., core network node 22) as implemented in accordance with one or more embodiments. As shown, the network node 1200 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above (e.g., in FIGS. 7-8), such as by executing instructions stored in memory 1230. The processing circuitry 1210 in this regard may implement certain functional means, units, or modules. The network node 1200 in some embodiments also includes power supply circuitry 1240 for supplying power to the network node 1200.

Figure 17:
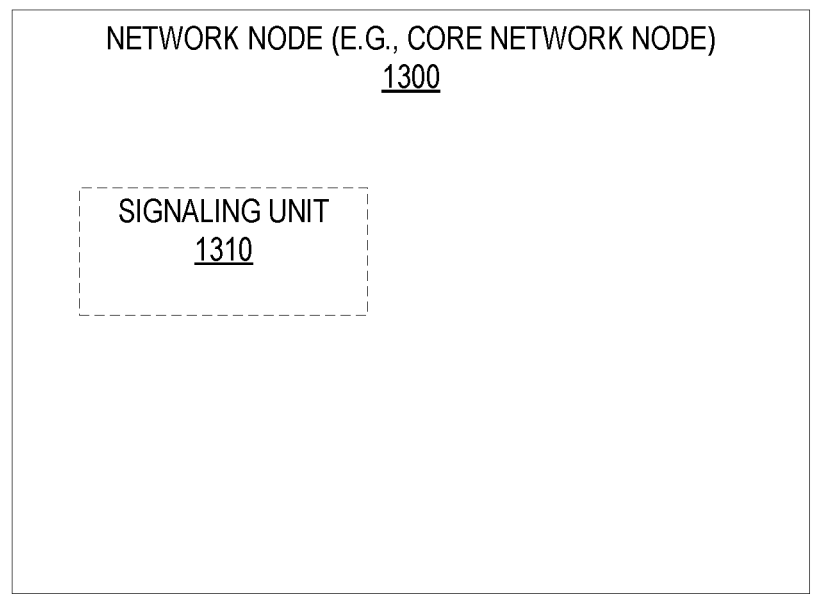
FIG. 17 is a block diagram of a network node according to other embodiments.

FIG. 17 illustrates a schematic block diagram of a network node 1300 (e.g., core network node 22) in a wireless network according to still other embodiments (for example, the wireless network shown in FIG. 22). As shown, the network node 1300 implements various functional means, units, or modules, e.g., via the processing circuitry 1210 in FIG. 16 and/or via software code. These functional means, units, or modules, e.g., for implementing the method(s) herein, include for instance a signalling unit or module 1310 for transmitting and/or receiving the signalling 20, 24 described herein. That is, the signalling unit or module 1310 may be for receiving from a wireless device 14 signaling 20 indicating whether the wireless device 14 has a wake-up receiver 14B for receiving a wake-up signal 18 that awakens the wireless device 14 from a sleep state (e.g., a "deep" sleep state, a "light" sleep state, or any other sleep state). Alternatively or additionally, the signalling unit or module 1310 may be for transmitting to a radio network node 12 signaling 24 indicating whether the wireless device 14 has a wake-up receiver 14B for receiving a wake-up signal 18 that awakens the wireless device 14 from a sleep state (e.g., a "deep" sleep state, a "light" sleep state, or any other sleep state). Alternatively or additionally, the signalling unit or module 1310 may be for receiving from a wireless device 14 signaling 20 indicating a wake-up period 20B over which the wireless device 14 is capable of awakening from a sleep state (e.g., a "deep" sleep state, a "light" sleep state, or any other sleep state). Alternatively or additionally, the signalling unit or module 1310 may be for transmitting to a radio network node 12 signaling 24 indicating a wake-up period 20B over which the wireless device 14 is capable of awakening from a sleep state (e.g., a "deep" sleep state, a "light" sleep state, or any other sleep state).

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

There has been a lot of work in 3GPP on specifying technologies to cover Machine-to-Machine (M2M) and/or Internet of Things (IoT) related use cases. The most recent work for 3GPP Release 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

As used herein, the LTE enhancements introduced in 3GPP Release 13,14 and 15 for MTC are referred to as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both eMTC and NB-IoT allow UE operation down to much lower SNR level compared to LTE, i.e. Es/Iot≥−15 dB being the lowest operating point for eMTC and NB-IoT which can be compared to −6 dB Es/IoT for "legacy" LTE.

Paging in MTC and NB-IoT

A paging message typically originates from a source and reaches the receiving network in the mobility management entity (MME). The MME keeps track of the UEs, knowing the which cell the UE last resided in. When the UE needs to be paged, the MME (first) informs the eNB (of the UE's last known location) that there is a paging message for the UE. The eNB then pages the UE at an appropriate occasion.

The UE is informed about the Paging cycle during the initial attach process as part of system information (SIB2). Now that UE knows about the paging cycle and its own paging occasions (POs), during which it will momentarily wake up, check if there is any paging message for itself. In-between the POs, the UE falls back to sleep to preserve power.

Release 15 focus on reducing UE power consumption even further, by introducing a specific power saving signal. This would allow the UE to skip decoding the relatively large xPDCCH to detect paging and go back to sleep faster.

It is an aim in both NB-IoT and Rel-15 enhancements for eMTC to further latency and power consumption reduction, in particular power consumption reduction for physical channels. A consideration for such reduction would be to specify for idle mode paging and/or connected mode DRX, a physical signal/channel that can be efficiently decoded or detected prior to decoding NPDCCH/NPDSCH. Similarly, for eMTC improved power consumption reduction for physical channels may be realized for idle mode paging and/or connected mode DRX by specifying a physical signal/channel that can be efficiently decoded or detected prior to decoding the physical downlink control/data channel.

In this regard, for both NB-IoT and eMTC, a physical signal/channel indicating whether the UE needs to decode subsequent physical channel(s) is introduced, at least for idle mode paging. This physical signal/channel is an example of the wake-up signal 18 in FIG. 1. Candidates for the signal/channel are: Wake-up signal or DTX; Go-to-sleep signal or DTX; Wake-up signal with no DTX; or Downlink control information. It is for further study (FFS) whether synchronization to the camped-on cell is assumed for detecting/decoding WUS/GTS, depending on the (e)DRX cycle length. Also, connected mode DRX is FFS.

The 'Wake-up signal' and 'Go-to-sleep signal' solutions are based on the transmission of a short signal which would indicate to the UE if it would have to continue to decode the full MPDCCH (eMTC) or NPDCCH (NB-IoT), here jointly referred to as xPDCCH. xPDCCH is one example of the downlink control channel 16 in FIG. 1. The decoding time for the former signal is considerably shorter than full MPDCCH or NPDCCH which gives a reduced UE power consumption and longer battery life. The 'Wake-up signal' (WUS) would be transmitted only when there is paging for the UE; if there is not, the WUS will not be transmitted (the meaning of DTX) and the UE would go back to sleep. The 'Go-to-sleep signal' (GTS) would be transmitted only when there is not any paging for the UE; if there is, the GTS will not be transmitted (the meaning of DTX in the above agreement) and the UE would continue to decode NPDCCH or MPDCCH.

In order to reach extremely low power consumption during sleep, the modem needs to be switched off entirely. Instead, monitoring of the WUS is taken care of by a dedicated wake-up radio (also referred to as a wake-up receiver 14B in FIG. 1) that implements a limited functionality of a modem receiver. The wake-up radio may operate with a fraction of the power of an ordinary radio. Typically, apart from a lower requirement analog and RF circuitry, the WUR is a correlator that is comparing the received signal with an a priori known sequence. It may also provide sync functionality to be able to detect the WUS more accurately and achieving sync and WUS are similar from an UE operations perspective. While the WUR is operating, the baseband remains in deep sleep thereby allowing for even further power savings. Due to the deep sleep state, though, the UE will require a longer wake-up time from detecting the WUS until it can receive the xPDCCH.

Known approaches do not allow for differentiation between normal IoT UEs, that are using their modem for wake-up signal (WUS) detection, and even more power efficient UEs that are using a dedicated wake-up radio (WUR) for detecting paging. Without this, UEs with WUR have difficulties to use their WUR since they require a longer start up duration from detecting the WUS until they can properly receive the downlink control channel (xPDCCH) in their assigned PO. Hence, there is a need for a method to differentiate UEs with WUR from normal UEs such that WUR UEs are able to use WUR when detecting the WUS.

Embodiments herein include multiple aspects concerning enabling WUR operation within the concept of wake-up signals in LTE-M and NB-IoT. A first aspect is the system allowing the UE and eNB to know when the WUR is used and when it is not, in order to be able to successfully perform paging operations with WUS. The second aspect is the eNB operation in this system, where, based on the signaling in the first aspect, and the UE capabilities that are identified from that signaling, the eNB may determine if WUS operation to a certain UE should be based on WUR or not (i.e. applying a longer gap between WUS and paging occasion). The third aspect is the corresponding UE operation where the UE may determine whether its WUR performance is sufficient for use in the present cell, or not.

Some embodiments thereby enable the use of a more low power receiver, the wake-up receiver, to achieve lower energy consumption and longer battery life for machine-type devices. Some embodiments solve the problem of coping with the additional delay required for switching on the data receiver for xPDCCH monitoring after the wake-up signal has been detected by the wake-up receiver.

Some embodiments allow a UE to be equipped with a dedicated wake-up radio such that paging operations may be performed more power efficiently. As a result, the UE can achieve a substantially increased longevity.

Consider now three aspects described more fully below. The first aspect is a system for utilization of wake-up receivers in a cellular system. The second aspect is a network node, transmitting configuration information and paging signals to a network device. The third aspect is a network device for receiving paging messages from a network node, using a wake-up radio.

Figure 18:
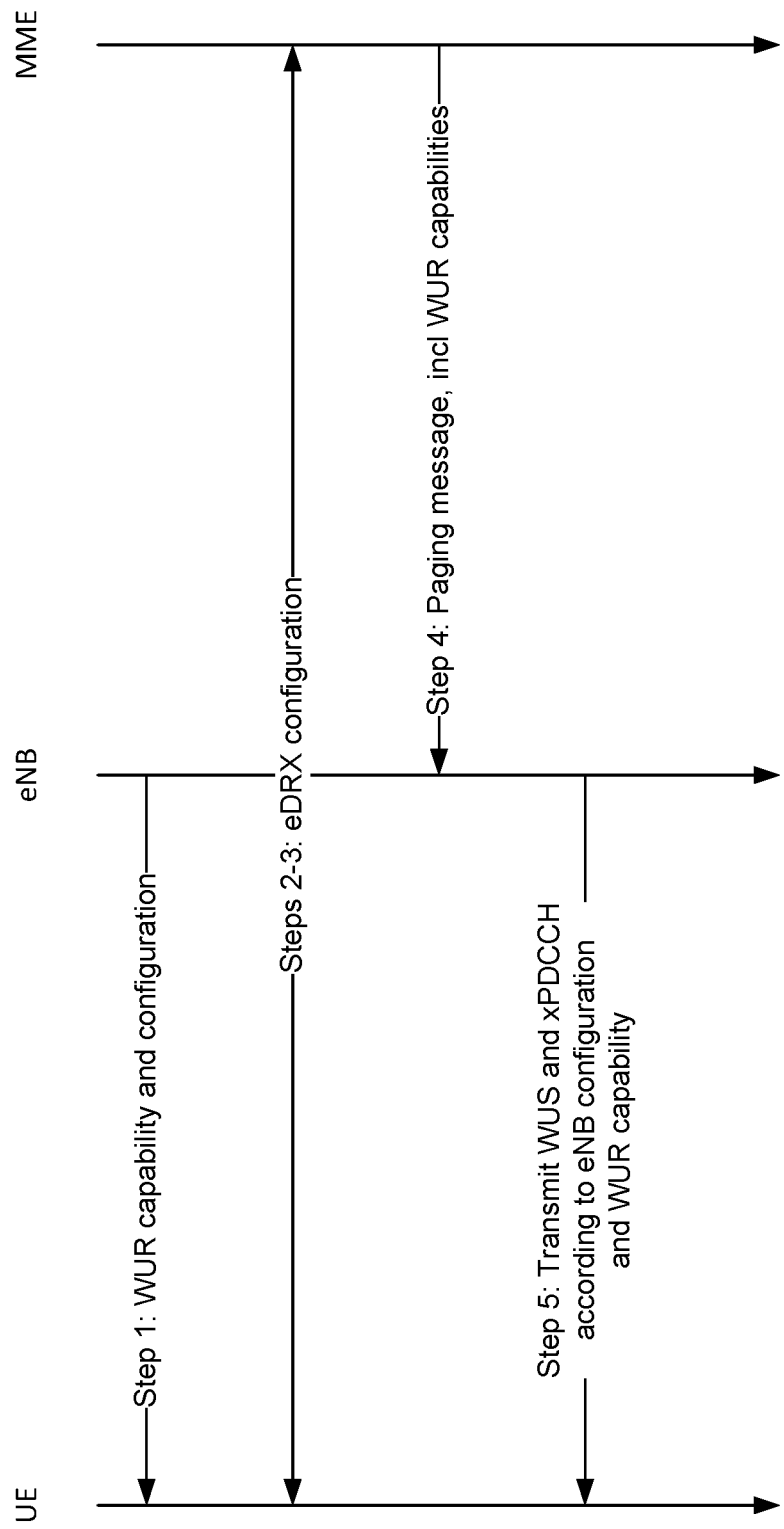
FIG. 18 is a call flow diagram for handling wake-up receiver capability according to some embodiments.

The first aspect is a system (e.g., specified according to a telecommunications standard). The system comprises a network node (eNB), another network node (MME), and a network device (UE) in which the system enables the UE to receive a wake-up signal (WUS) by help of a low power wake-up radio (WUR), different from the UE's normal modem radio that is used for data reception. In the system, the following steps are performed as shown in FIG. 18 for enabling the use of the WUR.

In Step 1, the eNB signals its WUR support for up to M POs, e.g., in a system information block (SIB).

In Step 2, a UE signals a WUR capability together with its WUS capability, e.g., when registering to the network. This can include a minimum wake-up delay within a set of predefined values, e.g., between 0.5 and 2 s. This information may be part of the container information that the MME keeps about the UE and is transparent to the MME. The MME only keeps this information.

In Step 3, the UE is configured for DRX or eDRX as usual, without specific reference to the WUR capability.

In Step 4, when the eNB receives a paging message for the UE, the eNB detects the WUR capability (e.g. appended to the UE radio paging capabilities in the paging message from MME to eNB) and determines if it complies with the configured eDRX/DRX configuration for the eNB/UE. The eNB schedules the UE according to the UE's WUR capabilities, e.g. not transmitting paging in the first POs which are closest to the WUS to include the delay for starting up the data receiver.

In Step 5, a UE waking up from deep sleep confirms its cell id from, e.g. the RSS, and already knows that the eNB supports WUR and if it is in compliance with that support. It then also knows that it is allowed to skip up to M POs upon detecting the WUS. A UE unable to confirm the cell id will start the data radio and perform cell search/reselection etc. After reading system information in the new cell, it will determine if WUR operation is enabled in that cell and act according to the steps above.

In another embodiment, in addition to the WUR support signaling, the eNB also signals a 1-to-N WUS-to-PO operation. Related to this, M is then chosen such that M<N or an even lower value, e.g., M=N−2, such that the eNB can escalate paging at least once if the UE does not respond to it.

In yet an alternative embodiment, the eNB would not broadcast that WUR is currently configured in a cell in system information and it would be inherent from the use of WUS, i.e. step 1 above is skipped.

As an example of a simple implementation, a WUR capability would be added to the other UE capabilities report at the initial Attach to the network. This WUR capability would also be added to the UE radio paging capability in the paging message from MME to eNB. eNB would from this understand that the UE is using WUR from monitoring the WUS and therefore omit scheduling the scheduling info (xPDCCH) for the paging message (xPDSCH) in the first POs after the WUS. How many POs would be omitted could be determined from a required delay X for switching on the data receiver after WUS reception. I.e. it would be clear to both eNB and UE that POs which are closer than X to the WUS will effectively not be used. (X could either be a cell-specific parameter broadcasted in SI and every WUR UE which could handle such a delay would be allowed to use WUR in the cell, or X could be UE specific, based on the individual UE's capability and stored in the UE context in MME, or X could be a common UE requirement which would have to be fulfilled in order for UEs to use WUR operation).

Network Node Aspect

Figure 19:
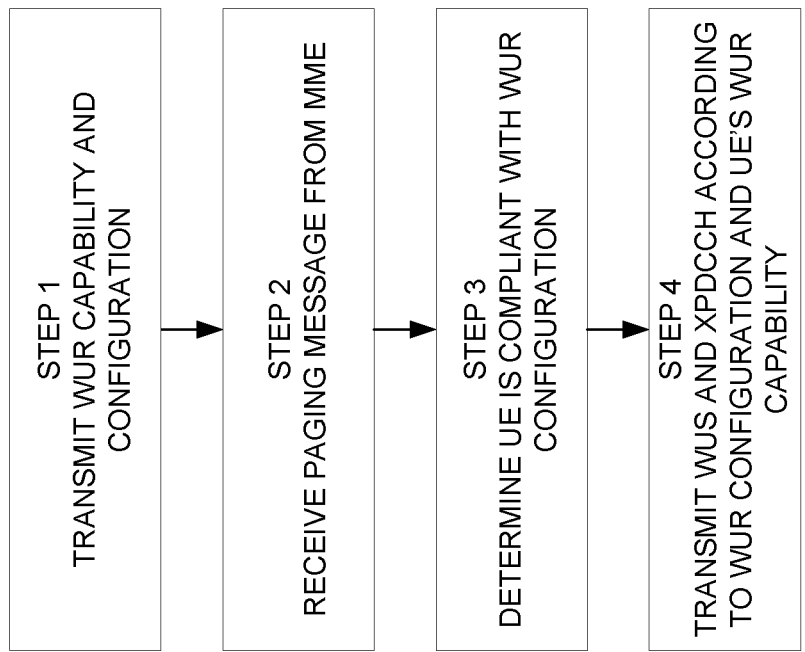
FIG. 19 is a logic flow diagram of a method performed by a wireless device according to still other embodiments.

The second aspect is a method in a eNB for transmitting configuration and paging information to a UE that is equipped with a WUR, providing the UE with sufficient time to wake up, i.e., initialize its modem, from a deep sleep mode of operation that is assumed in-between paging occasions (POs). FIG. 19 illustrates one embodiment of the network aspect.

In a first step, the eNB transmits configuration information about using WUR and paging information to a UE. This information may be broadcast, e.g., in system information like SIB, or through dedicated to a UE through a control message. The configuration information may comprise, e.g., a number of POs that every WUS is valid for, and a maximum delay, in terms of POs/DRX cycles, the eNB accepts as a delay for the WUR. The configuration may also be associated with a eDRX WUS-to-PO ratio, representing the number of POs every WUS applies to.

In a second step, upon receiving a paging message from the MME, within the message is comprised WUR information such as WUR capability, and WUR performance in the WUR's latency requirement. This has previously been signaled through NAS to the MME from the UE. The eNB compares the WUR capability with its own WUR support, such that if the UE's WUR latency (i.e., minimum wake-up duration) is smaller than the maximum WUR latency of the eNB, e.g., calculated as the DRX period times a number of maximum missed DRX periods, the UE is expected to use the WUR, whereas if the UE's WUR latency is bigger, the UE is expected to use its modem radio.

In a third step, the eNB determines which PO is suitable to include a paging message in, in relation to the UE's WUR capability, such that the PO is not transmitted ahead of the UE being awoken.

For example, the UE will have a minimum wake up time, from detecting the WUS until it is able to receive xPDCCH. Hence, if scheduled with WUR, the eNB will need to use a minimum delay between the WUS and PO that is at least as big as the UE's minimum delay. Then the UE for certain will be awoken when the xPDCCH is transmitted.

In a fourth step, the WUS is transmitted at its predefined instant, and following that, the paging message is transmitted at its determined instant.

In an independent embodiment, a neighboring second eNB may receive a paging message from the MME, instructing it to page a WUR capable UE. Included in the paging message is an indication whether the paging message is a first or a second paging message, which in case the eNB is a neighboring eNB, is a second paging message. Hence, the second eNB may assume the UE has awoken and detected its cell change and is thereby operating with its modem receiver.

Device Aspect

The third aspect is the device aspect, in which a UE receives configuration information about the eNB being WUR capable, and the eNB's maximum WUR latency, and based on that determines if it can use its WUR or if it should use the modem radio for reception of a wake-up signal.

Figure 20:
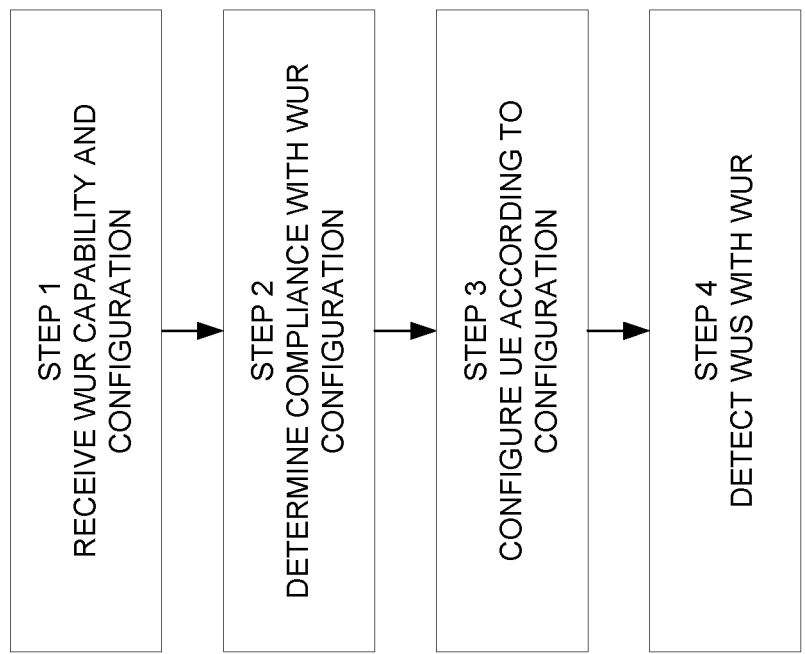
FIG. 20 is a logic flow diagram of a method performed by a wireless device according to yet other embodiments.
Figure 21:
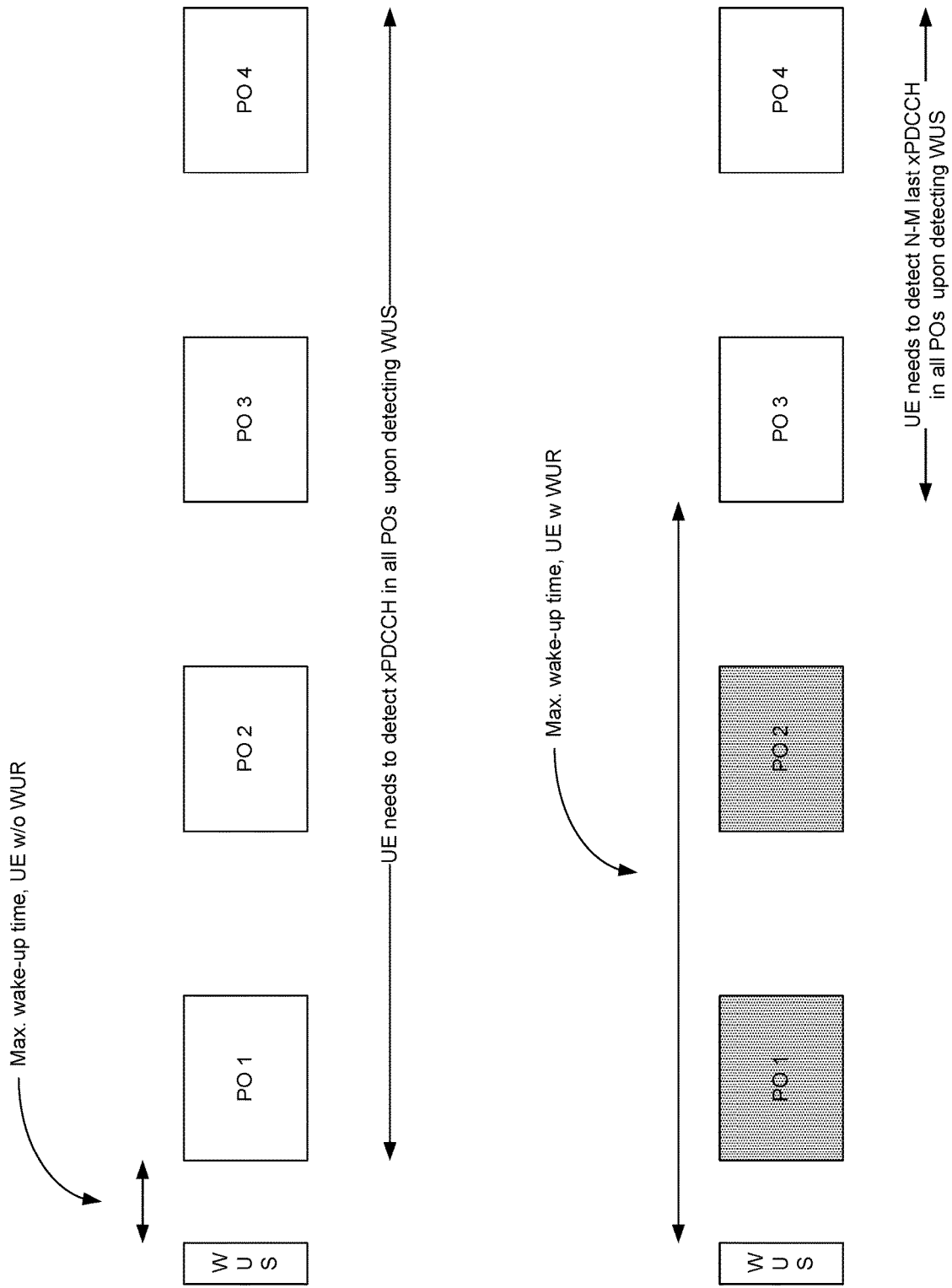
FIG. 21 is a block diagram of paging occasions with and without a wake-up receiver for detecting a wake-up signal.

In a first step in FIG. 20, the UE receives configuration information from the eNB about the eNB's WUR configuration. In a second step, based on that configuration, e.g., DRX cycle length, PDRX, WUS-to-PO mapping N and number of allowed POs to skip, M, the UE may determine whether it is compliant with the used WUR configuration and hence referable for it to detect WUS with its WUR, based also on its own knowledge of the WUR performance. For example, if PDRX=1 s, N=4 and M=2, the UE may use its WUR if the WUR wake-up latency does not exceed PDRX×M=2 s, see FIG. 21. Here it can be noted that should the distance between the WUS and the PO be a significant part of the DRX cycle length, this part may also be included in the wake-up time. It would also mean that the UE would be able to attempt to detect the xPDCCH in two subsequent POs, should the first attempt fail. In a third step, the UE configures itself to use the WUR whereafter it may go to sleep according to a predefined sleep mode. This sleep mode may now be a deeper sleep mode due to the WUR is used, than otherwise would be the case. In a fourth step, the WUR attempts to detect the WUS at its predefined location. Here some margin may also be inserted due to timing drift during the deep sleep mode.

In alternative embodiments, the signaled eNB WUS configuration may be independent of the DRX period, and instead be a direct indication of time. In this case the time indication is directly compared to the UE's WUR wake-up performance.

Paging Shift

In a somewhat different embodiment, the WUR capability, i.e. when the UE has reported that is supports WUR and eNB broadcasts in SI that it is currently using WUR, the entire paging procedure is shifted in time and postponed relative to the time the paging request is sent from MME to eNB. This keeps the WUS and WUR solution transparent from the MME, i.e. MME is not aware whether WUS/WUR or the legacy paging procedure is used by eNB. In this case, the RAN paging procedure using WUS would be kept the same only that the PTW is postponed a certain number of POs. This is similar to the solution above, but no POs are omitted, i.e. there will still be N paging POs if configured but the starting point will be postponed in time depending on the required WUR delay (i.e. time requirement for starting up the data receiver).

Since the multiple POs in a PTW were introduced for robustness upon cell change, since different cells are not required to be tightly synchronized, in one embodiment WUR operation is not allowed for the first PTW in a new cell, or even before paging has been received in the new cell.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network 2206, network nodes 2260 and 2260b, and WDs 2210, 2210b, and 2210c. In practice, a wireless network may further include any additional elements suitable to support communication between wireless devices or between a wireless device and another communication device, such as a landline telephone, a service provider, or any other network node or end device. Of the illustrated components, network node 2260 and wireless device (WD) 2210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2260 and WD 2210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node 2260 includes processing circuitry 2270, device readable medium 2280, interface 2290, auxiliary equipment 2284, power source 2286, power circuitry 2287, and antenna 2262. Although network node 2260 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2260 are depicted as single boxes located within a larger box, or nested within multiple boxes, in practice, a network node may comprise multiple different physical components that make up a single illustrated component (e.g., device readable medium 2280 may comprise multiple separate hard drives as well as multiple RAM modules).

Similarly, network node 2260 may be composed of multiple physically separate components (e.g., a NodeB component and a RNC component, or a BTS component and a BSC component, etc.), which may each have their own respective components. In certain scenarios in which network node 2260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2260 may be configured to support multiple radio access technologies (RATs). In such embodiments, some components may be duplicated (e.g., separate device readable medium 2280 for the different RATs) and some components may be reused (e.g., the same antenna 2262 may be shared by the RATs). Network node 2260 may also include multiple sets of the various illustrated components for different wireless technologies integrated into network node 2260, such as, for example, GSM, WCDMA, LTE, NR, WiFi, or Bluetooth wireless technologies. These wireless technologies may be integrated into the same or different chip or set of chips and other components within network node 2260.

Processing circuitry 2270 is configured to perform any determining, calculating, or similar operations (e.g., certain obtaining operations) described herein as being provided by a network node. These operations performed by processing circuitry 2270 may include processing information obtained by processing circuitry 2270 by, for example, converting the obtained information into other information, comparing the obtained information or converted information to information stored in the network node, and/or performing one or more operations based on the obtained information or converted information, and as a result of said processing making a determination.

Processing circuitry 2270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2260 components, such as device readable medium 2280, network node 2260 functionality. For example, processing circuitry 2270 may execute instructions stored in device readable medium 2280 or in memory within processing circuitry 2270. Such functionality may include providing any of the various wireless features, functions, or benefits discussed herein. In some embodiments, processing circuitry 2270 may include a system on a chip (SOC).

In some embodiments, processing circuitry 2270 may include one or more of radio frequency (RF) transceiver circuitry 2272 and baseband processing circuitry 2274. In some embodiments, radio frequency (RF) transceiver circuitry 2272 and baseband processing circuitry 2274 may be on separate chips (or sets of chips), boards, or units, such as radio units and digital units. In alternative embodiments, part or all of RF transceiver circuitry 2272 and baseband processing circuitry 2274 may be on the same chip or set of chips, boards, or units In certain embodiments, some or all of the functionality described herein as being provided by a network node, base station, eNB or other such network device may be performed by processing circuitry 2270 executing instructions stored on device readable medium 2280 or memory within processing circuitry 2270. In alternative embodiments, some or all of the functionality may be provided by processing circuitry 2270 without executing instructions stored on a separate or discrete device readable medium, such as in a hard-wired manner. In any of those embodiments, whether executing instructions stored on a device readable storage medium or not, processing circuitry 2270 can be configured to perform the described functionality. The benefits provided by such functionality are not limited to processing circuitry 2270 alone or to other components of network node 2260, but are enjoyed by network node 2260 as a whole, and/or by end users and the wireless network generally.

Device readable medium 2280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2270. Device readable medium 2280 may store any suitable instructions, data or information, including a computer program, software, an application including one or more of logic, rules, code, tables, etc. and/or other instructions capable of being executed by processing circuitry 2270 and, utilized by network node 2260. Device readable medium 2280 may be used to store any calculations made by processing circuitry 2270 and/or any data received via interface 2290. In some embodiments, processing circuitry 2270 and device readable medium 2280 may be considered to be integrated.

Interface 2290 is used in the wired or wireless communication of signalling and/or data between network node 2260, network 2206, and/or WDs 2210. As illustrated, interface 2290 comprises port(s)/terminal(s) 2294 to send and receive data, for example to and from network 2206 over a wired connection. Interface 2290 also includes radio front end circuitry 2292 that may be coupled to, or in certain embodiments a part of, antenna 2262. Radio front end circuitry 2292 comprises filters 2298 and amplifiers 2296. Radio front end circuitry 2292 may be connected to antenna 2262 and processing circuitry 2270. Radio front end circuitry may be configured to condition signals communicated between antenna 2262 and processing circuitry 2270. Radio front end circuitry 2292 may receive digital data that is to be sent out to other network nodes or WDs via a wireless connection. Radio front end circuitry 2292 may convert the digital data into a radio signal having the appropriate channel and bandwidth parameters using a combination of filters 2298 and/or amplifiers 2296. The radio signal may then be transmitted via antenna 2262. Similarly, when receiving data, antenna 2262 may collect radio signals which are then converted into digital data by radio front end circuitry 2292. The digital data may be passed to processing circuitry 2270. In other embodiments, the interface may comprise different components and/or different combinations of components.

In certain alternative embodiments, network node 2260 may not include separate radio front end circuitry 2292, instead, processing circuitry 2270 may comprise radio front end circuitry and may be connected to antenna 2262 without separate radio front end circuitry 2292. Similarly, in some embodiments, all or some of RF transceiver circuitry 2272 may be considered a part of interface 2290. In still other embodiments, interface 2290 may include one or more ports or terminals 2294, radio front end circuitry 2292, and RF transceiver circuitry 2272, as part of a radio unit (not shown), and interface 2290 may communicate with baseband processing circuitry 2274, which is part of a digital unit (not shown).

Antenna 2262 may include one or more antennas, or antenna arrays, configured to send and/or receive wireless signals. Antenna 2262 may be coupled to radio front end circuitry 2290 and may be any type of antenna capable of transmitting and receiving data and/or signals wirelessly. In some embodiments, antenna 2262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2262 may be separate from network node 2260 and may be connectable to network node 2260 through an interface or port.

Antenna 2262, interface 2290, and/or processing circuitry 2270 may be configured to perform any receiving operations and/or certain obtaining operations described herein as being performed by a network node. Any information, data and/or signals may be received from a wireless device, another network node and/or any other network equipment. Similarly, antenna 2262, interface 2290, and/or processing circuitry 2270 may be configured to perform any transmitting operations described herein as being performed by a network node. Any information, data and/or signals may be transmitted to a wireless device, another network node and/or any other network equipment.

Power circuitry 2287 may comprise, or be coupled to, power management circuitry and is configured to supply the components of network node 2260 with power for performing the functionality described herein. Power circuitry 2287 may receive power from power source 2286. Power source 2286 and/or power circuitry 2287 may be configured to provide power to the various components of network node 2260 in a form suitable for the respective components (e.g., at a voltage and current level needed for each respective component). Power source 2286 may either be included in, or external to, power circuitry 2287 and/or network node 2260. For example, network node 2260 may be connectable to an external power source (e.g., an electricity outlet) via an input circuitry or interface such as an electrical cable, whereby the external power source supplies power to power circuitry 2287. As a further example, power source 2286 may comprise a source of power in the form of a battery or battery pack which is connected to, or integrated in, power circuitry 2287. The battery may provide backup power should the external power source fail. Other types of power sources, such as photovoltaic devices, may also be used.

Alternative embodiments of network node 2260 may include additional components beyond those shown in FIG. 22 that may be responsible for providing certain aspects of the network node's functionality, including any of the functionality described herein and/or any functionality necessary to support the subject matter described herein. For example, network node 2260 may include user interface equipment to allow input of information into network node 2260 and to allow output of information from network node 2260. This may allow a user to perform diagnostic, maintenance, repair, and other administrative functions for network node 2260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2210 includes antenna 2211, interface 2214, processing circuitry 2220, device readable medium 2230, user interface equipment 2232, auxiliary equipment 2234, power source 2236 and power circuitry 2237. WD 2210 may include multiple sets of one or more of the illustrated components for different wireless technologies supported by WD 2210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2210.

Antenna 2211 may include one or more antennas or antenna arrays, configured to send and/or receive wireless signals, and is connected to interface 2214. In certain alternative embodiments, antenna 2211 may be separate from WD 2210 and be connectable to WD 2210 through an interface or port. Antenna 2211, interface 2214, and/or processing circuitry 2220 may be configured to perform any receiving or transmitting operations described herein as being performed by a WD. Any information, data and/or signals may be received from a network node and/or another WD. In some embodiments, radio front end circuitry and/or antenna 2211 may be considered an interface.

As illustrated, interface 2214 comprises radio front end circuitry 2212 and antenna 2211. Radio front end circuitry 2212 comprise one or more filters 2218 and amplifiers 2216. Radio front end circuitry 2214 is connected to antenna 2211 and processing circuitry 2220, and is configured to condition signals communicated between antenna 2211 and processing circuitry 2220. Radio front end circuitry 2212 may be coupled to or a part of antenna 2211. In some embodiments, WD 2210 may not include separate radio front end circuitry 2212; rather, processing circuitry 2220 may comprise radio front end circuitry and may be connected to antenna 2211. Similarly, in some embodiments, some or all of RF transceiver circuitry 2222 may be considered a part of interface

2214. Radio front end circuitry 2212 may receive digital data that is to be sent out to other network nodes or WDs via a wireless connection. Radio front end circuitry 2212 may convert the digital data into a radio signal having the appropriate channel and bandwidth parameters using a combination of filters 2218 and/or amplifiers 2216. The radio signal may then be transmitted via antenna 2211. Similarly, when receiving data, antenna 2211 may collect radio signals which are then converted into digital data by radio front end circuitry 2212. The digital data may be passed to processing circuitry 2220. In other embodiments, the interface may comprise different components and/or different combinations of components.

Processing circuitry 2220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2210 components, such as device readable medium 2230, WD 2210 functionality. Such functionality may include providing any of the various wireless features or benefits discussed herein. For example, processing circuitry 2220 may execute instructions stored in device readable medium 2230 or in memory within processing circuitry 2220 to provide the functionality disclosed herein.

As illustrated, processing circuitry 2220 includes one or more of RF transceiver circuitry 2222, baseband processing circuitry 2224, and application processing circuitry 2226. In other embodiments, the processing circuitry may comprise different components and/or different combinations of components. In certain embodiments processing circuitry 2220 of WD 2210 may comprise a SOC. In some embodiments, RF transceiver circuitry 2222, baseband processing circuitry 2224, and application processing circuitry 2226 may be on separate chips or sets of chips. In alternative embodiments, part or all of baseband processing circuitry 2224 and application processing circuitry 2226 may be combined into one chip or set of chips, and RF transceiver circuitry 2222 may be on a separate chip or set of chips. In still alternative embodiments, part or all of RF transceiver circuitry 2222 and baseband processing circuitry 2224 may be on the same chip or set of chips, and application processing circuitry 2226 may be on a separate chip or set of chips. In yet other alternative embodiments, part or all of RF transceiver circuitry 2222, baseband processing circuitry 2224, and application processing circuitry 2226 may be combined in the same chip or set of chips. In some embodiments, RF transceiver circuitry 2222 may be a part of interface 2214. RF transceiver circuitry 2222 may condition RF signals for processing circuitry 2220.

In certain embodiments, some or all of the functionality described herein as being performed by a WD may be provided by processing circuitry 2220 executing instructions stored on device readable medium 2230, which in certain embodiments may be a computer-readable storage medium. In alternative embodiments, some or all of the functionality may be provided by processing circuitry 2220 without executing instructions stored on a separate or discrete device readable storage medium, such as in a hard-wired manner. In any of those particular embodiments, whether executing instructions stored on a device readable storage medium or not, processing circuitry 2220 can be configured to perform the described functionality. The benefits provided by such functionality are not limited to processing circuitry 2220 alone or to other components of WD 2210, but are enjoyed by WD 2210 as a whole, and/or by end users and the wireless network generally.

Processing circuitry 2220 may be configured to perform any determining, calculating, or similar operations (e.g., certain obtaining operations) described herein as being performed by a WD. These operations, as performed by processing circuitry 2220, may include processing information obtained by processing circuitry 2220 by, for example, converting the obtained information into other information, comparing the obtained information or converted information to information stored by WD 2210, and/or performing one or more operations based on the obtained information or converted information, and as a result of said processing making a determination.

Device readable medium 2230 may be operable to store a computer program, software, an application including one or more of logic, rules, code, tables, etc. and/or other instructions capable of being executed by processing circuitry 2220. Device readable medium 2230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2220. In some embodiments, processing circuitry 2220 and device readable medium 2230 may be considered to be integrated.

User interface equipment 2232 may provide components that allow for a human user to interact with WD 2210. Such interaction may be of many forms, such as visual, audial, tactile, etc. User interface equipment 2232 may be operable to produce output to the user and to allow the user to provide input to WD 2210. The type of interaction may vary depending on the type of user interface equipment 2232 installed in WD 2210. For example, if WD 2210 is a smart phone, the interaction may be via a touch screen; if WD 2210 is a smart meter, the interaction may be through a screen that provides usage (e.g., the number of gallons used) or a speaker that provides an audible alert (e.g., if smoke is detected). User interface equipment 2232 may include input interfaces, devices and circuits, and output interfaces, devices and circuits. User interface equipment 2232 is configured to allow input of information into WD 2210, and is connected to processing circuitry 2220 to allow processing circuitry 2220 to process the input information. User interface equipment 2232 may include, for example, a microphone, a proximity or other sensor, keys/buttons, a touch display, one or more cameras, a USB port, or other input circuitry. User interface equipment 2232 is also configured to allow output of information from WD 2210, and to allow processing circuitry 2220 to output information from WD 2210. User interface equipment 2232 may include, for example, a speaker, a display, vibrating circuitry, a USB port, a headphone interface, or other output circuitry. Using one or more input and output interfaces, devices, and circuits, of user interface equipment 2232, WD 2210 may communicate with end users and/or the wireless network, and allow them to benefit from the functionality described herein.

Auxiliary equipment 2234 is operable to provide more specific functionality which may not be generally performed by WDs. This may comprise specialized sensors for doing measurements for various purposes, interfaces for additional types of communication such as wired communications etc.

The inclusion and type of components of auxiliary equipment 2234 may vary depending on the embodiment and/or scenario.

Power source 2236 may, in some embodiments, be in the form of a battery or battery pack. Other types of power sources, such as an external power source (e.g., an electricity outlet), photovoltaic devices or power cells, may also be used. WD 2210 may further comprise power circuitry 2237 for delivering power from power source 2236 to the various parts of WD 2210 which need power from power source 2236 to carry out any functionality described or indicated herein. Power circuitry 2237 may in certain embodiments comprise power management circuitry. Power circuitry 2237 may additionally or alternatively be operable to receive power from an external power source; in which case WD 2210 may be connectable to the external power source (such as an electricity outlet) via input circuitry or an interface such as an electrical power cable. Power circuitry 2237 may also in certain embodiments be operable to deliver power from an external power source to power source 2236. This may be, for example, for the charging of power source 2236. Power circuitry 2237 may perform any formatting, converting, or other modification to the power from power source 2236 to make the power suitable for the respective components of WD 2210 to which power is supplied.

Figure 23:
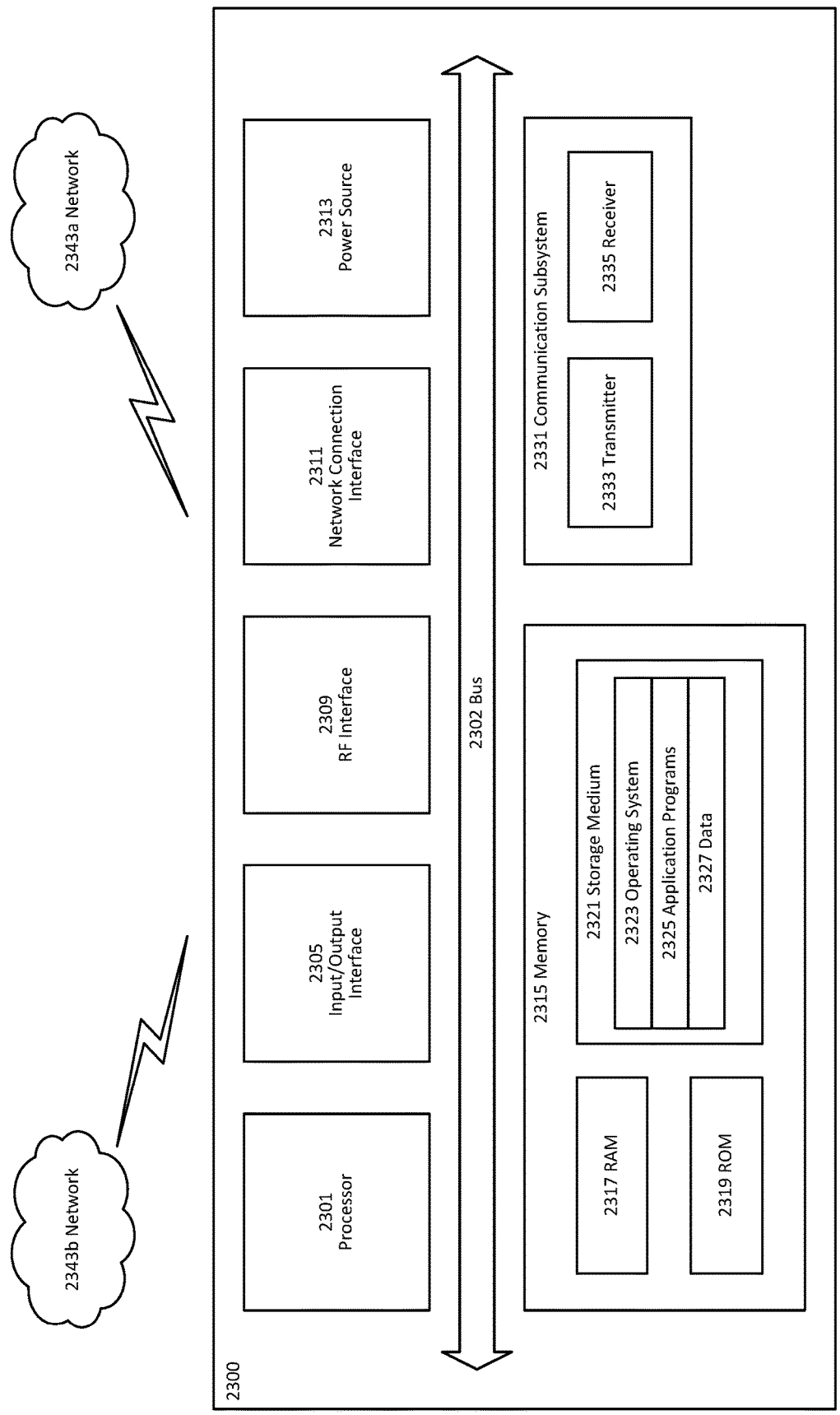
FIG. 23 is a block diagram of a user equipment according to some embodiments.

FIG. 23 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 23200 may be any UE identified by the 3rd Generation Partnership Project (3GPP), including a NB-IoT UE, a machine type communication (MTC) UE, and/or an enhanced MTC (eMTC) UE. UE 2300, as illustrated in FIG. 23, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE 2300 includes processing circuitry 2301 that is operatively coupled to input/output interface 2305, radio frequency (RF) interface 2309, network connection interface 2311, memory 2315 including random access memory (RAM) 2317, read-only memory (ROM) 2319, and storage medium 2321 or the like, communication subsystem 2331, power source 2333, and/or any other component, or any combination thereof. Storage medium 2321 includes operating system 2323, application program 2325, and data 2327. In other embodiments, storage medium 2321 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry 2301 may be configured to process computer instructions and data. Processing circuitry 2301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2301 may include two central processing units (CPUs). Data may be information in a form suitable for use by a computer.

In the depicted embodiment, input/output interface 2305 may be configured to provide a communication interface to an input device, output device, or input and output device. UE 2300 may be configured to use an output device via input/output interface 2305. An output device may use the same type of interface port as an input device. For example, a USB port may be used to provide input to and output from UE 2300. The output device may be a speaker, a sound card, a video card, a display, a monitor, a printer, an actuator, an emitter, a smartcard, another output device, or any combination thereof. UE 2300 may be configured to use an input device via input/output interface 2305 to allow a user to capture information into UE 2300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface 2309 may be configured to provide a communication interface to RF components such as a transmitter, a receiver, and an antenna. Network connection interface 2311 may be configured to provide a communication interface to network 2343a. Network 2343a may encompass wired and/or wireless networks such as a local-area network (LAN), a wide-area network (WAN), a computer network, a wireless network, a telecommunications network, another like network or any combination thereof. For example, network 2343a may comprise a Wi-Fi network. Network connection interface 2311 may be configured to include a receiver and a transmitter interface used to communicate with one or more other devices over a communication network according to one or more communication protocols, such as Ethernet, TCP/IP, SONET, ATM, or the like. Network connection interface 2311 may implement receiver and transmitter functionality appropriate to the communication network links (e.g., optical, electrical, and the like). The transmitter and receiver functions may share circuit components, software or firmware, or alternatively may be implemented separately.

RAM 2317 may be configured to interface via bus 2302 to processing circuitry 2301 to provide storage or caching of data or computer instructions during the execution of software programs such as the operating system, application programs, and device drivers. ROM 2319 may be configured to provide computer instructions or data to processing circuitry 2301. For example, ROM 2319 may be configured to store invariant low-level system code or data for basic system functions such as basic input and output (I/O), startup, or reception of keystrokes from a keyboard that are stored in a non-volatile memory. Storage medium 2321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2321 may be configured to include operating system 2323, application program 2325 such as a web browser application, a widget or gadget engine or another application, and data file 2327. Storage medium 2321 may store, for use by UE 2300, any of a variety of various operating systems or combinations of operating systems.

Storage medium 2321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2321 may allow UE 2300 to access computer-executable instructions, application programs or the like, stored on transitory or non-transitory memory media, to off-load data, or to upload data. An article of manufacture, such as one utilizing a communication system may be tangibly embodied in storage medium 2321, which may comprise a device readable medium.

In FIG. 23, processing circuitry 2301 may be configured to communicate with network 2343b using communication subsystem 2331. Network 2343a and network 2343b may be the same network or networks or different network or networks. Communication subsystem 2331 may be configured to include one or more transceivers used to communicate with network 2343b. For example, communication subsystem 2331 may be configured to include one or more transceivers used to communicate with one or more remote transceivers of another device capable of wireless communication such as another WD, UE, or base station of a radio access network (RAN) according to one or more communication protocols, such as IEEE 802.23, CDMA, WCDMA, GSM, LTE, UTRAN, WiMax, or the like. Each transceiver may include transmitter 2333 and/or receiver 2335 to implement transmitter or receiver functionality, respectively, appropriate to the RAN links (e.g., frequency allocations and the like). Further, transmitter 2333 and receiver 2335 of each transceiver may share circuit components, software or firmware, or alternatively may be implemented separately.

In the illustrated embodiment, the communication functions of communication subsystem 2331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2331 may include cellular communication, Wi-Fi communication, Bluetooth communication, and GPS communication. Network 2343b may encompass wired and/or wireless networks such as a local-area network (LAN), a wide-area network (WAN), a computer network, a wireless network, a telecommunications network, another like network or any combination thereof. For example, network 2343b may be a cellular network, a Wi-Fi network, and/or a near-field network. Power source 2313 may be configured to provide alternating current (AC) or direct current (DC) power to components of UE 2300.

The features, benefits and/or functions described herein may be implemented in one of the components of UE 2300 or partitioned across multiple components of UE 2300. Further, the features, benefits, and/or functions described herein may be implemented in any combination of hardware, software or firmware. In one example, communication subsystem 2331 may be configured to include any of the components described herein. Further, processing circuitry 2301 may be configured to communicate with any of such components over bus 2302. In another example, any of such components may be represented by program instructions stored in memory that when executed by processing circuitry 2301 perform the corresponding functions described herein. In another example, the functionality of any of such components may be partitioned between processing circuitry 2301 and communication subsystem 2331. In another example, the non-computationally intensive functions of any of such components may be implemented in software or firmware and the computationally intensive functions may be implemented in hardware.

Figure 24:
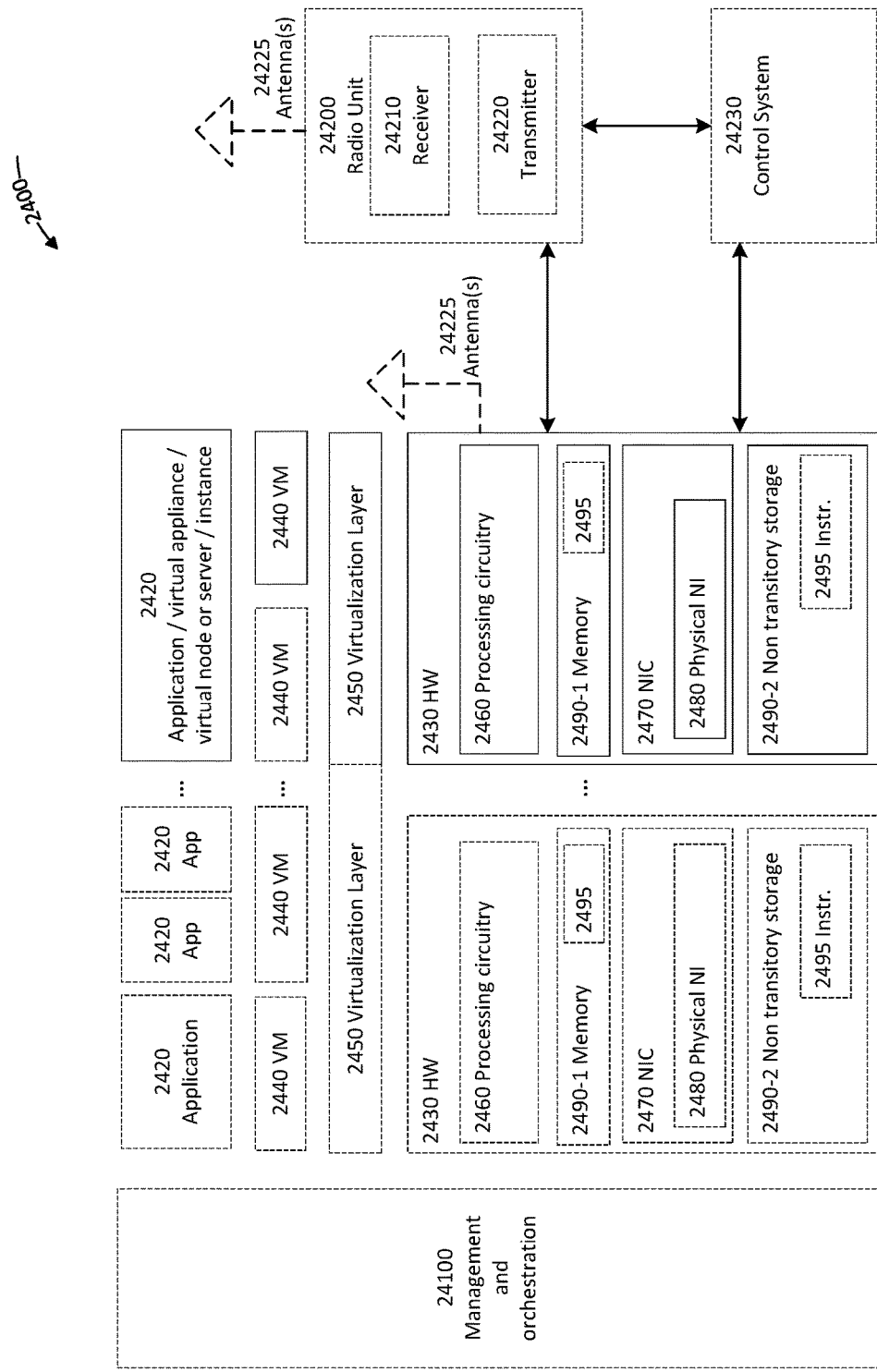
FIG. 24 is a block diagram of a virtualization environment according to some embodiments.

FIG. 24 is a schematic block diagram illustrating a virtualization environment 2400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2400 hosted by one or more of hardware nodes 2430. Further, in embodiments in which the virtual node is not a radio access node or does not require radio connectivity (e.g., a core network node), then the network node may be entirely virtualized.

The functions may be implemented by one or more applications 2420 (which may alternatively be called software instances, virtual appliances, network functions, virtual nodes, virtual network functions, etc.) operative to implement some of the features, functions, and/or benefits of some of the embodiments disclosed herein. Applications 2420 are run in virtualization environment 2400 which provides hardware 2430 comprising processing circuitry 2460 and memory 2490. Memory 2490 contains instructions 2495 executable by processing circuitry 2460 whereby application 2420 is operative to provide one or more of the features, benefits, and/or functions disclosed herein.

Virtualization environment 2400, comprises general-purpose or special-purpose network hardware devices 2430 comprising a set of one or more processors or processing circuitry 2460, which may be commercial off-the-shelf (COTS) processors, dedicated Application Specific Integrated Circuits (ASICs), or any other type of processing circuitry including digital or analog hardware components or special purpose processors. Each hardware device may comprise memory 2490-1 which may be non-persistent memory for temporarily storing instructions 2495 or software executed by processing circuitry 2460. Each hardware device may comprise one or more network interface controllers (NICs) 2470, also known as network interface cards, which include physical network interface 2480. Each hardware device may also include non-transitory, persistent, machine-readable storage media 2490-2 having stored therein software 2495 and/or instructions executable by processing circuitry 2460. Software 2495 may include any type of software including software for instantiating one or more virtualization layers 2450 (also referred to as hypervisors), software to execute virtual machines 2440 as well as software allowing it to execute functions, features and/or benefits described in relation with some embodiments described herein.

Virtual machines 2440, comprise virtual processing, virtual memory, virtual networking or interface and virtual storage, and may be run by a corresponding virtualization layer 2450 or hypervisor. Different embodiments of the instance of virtual appliance 2420 may be implemented on one or more of virtual machines 2440, and the implementations may be made in different ways.

During operation, processing circuitry 2460 executes software 2495 to instantiate the hypervisor or virtualization layer 2450, which may sometimes be referred to as a virtual machine monitor (VMM). Virtualization layer 2450 may present a virtual operating platform that appears like networking hardware to virtual machine 2440.

As shown in FIG. 24, hardware 2430 may be a standalone network node with generic or specific components. Hardware 2430 may comprise antenna 24225 and may implement some functions via virtualization. Alternatively, hardware 2430 may be part of a larger cluster of hardware (e.g. such as in a data center or customer premise equipment (CPE)) where many hardware nodes work together and are managed via management and orchestration (MANO) 24100, which, among others, oversees lifecycle management of applications 2420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2440 may be a software implementation of a physical machine that runs programs as if they were executing on a physical, non-virtualized machine. Each of virtual machines 2440, and that part of hardware 2430 that executes that virtual machine, be it hardware dedicated to that virtual machine and/or hardware shared by that virtual machine with others of the virtual machines 2440, forms a separate virtual network elements (VNE).

Still in the context of NFV, Virtual Network Function (VNF) is responsible for handling specific network functions that run in one or more virtual machines 2440 on top of hardware networking infrastructure 2430 and corresponds to application 2420 in FIG. 24.

In some embodiments, one or more radio units 24200 that each include one or more transmitters 24220 and one or more receivers 24210 may be coupled to one or more antennas 24225. Radio units 24200 may communicate directly with hardware nodes 2430 via one or more appropriate network interfaces and may be used in combination with the virtual components to provide a virtual node with radio capabilities, such as a radio access node or a base station.

In some embodiments, some signalling can be effected with the use of control system 24230 which may alternatively be used for communication between the hardware nodes 2430 and radio units 24200.

Figure 25:
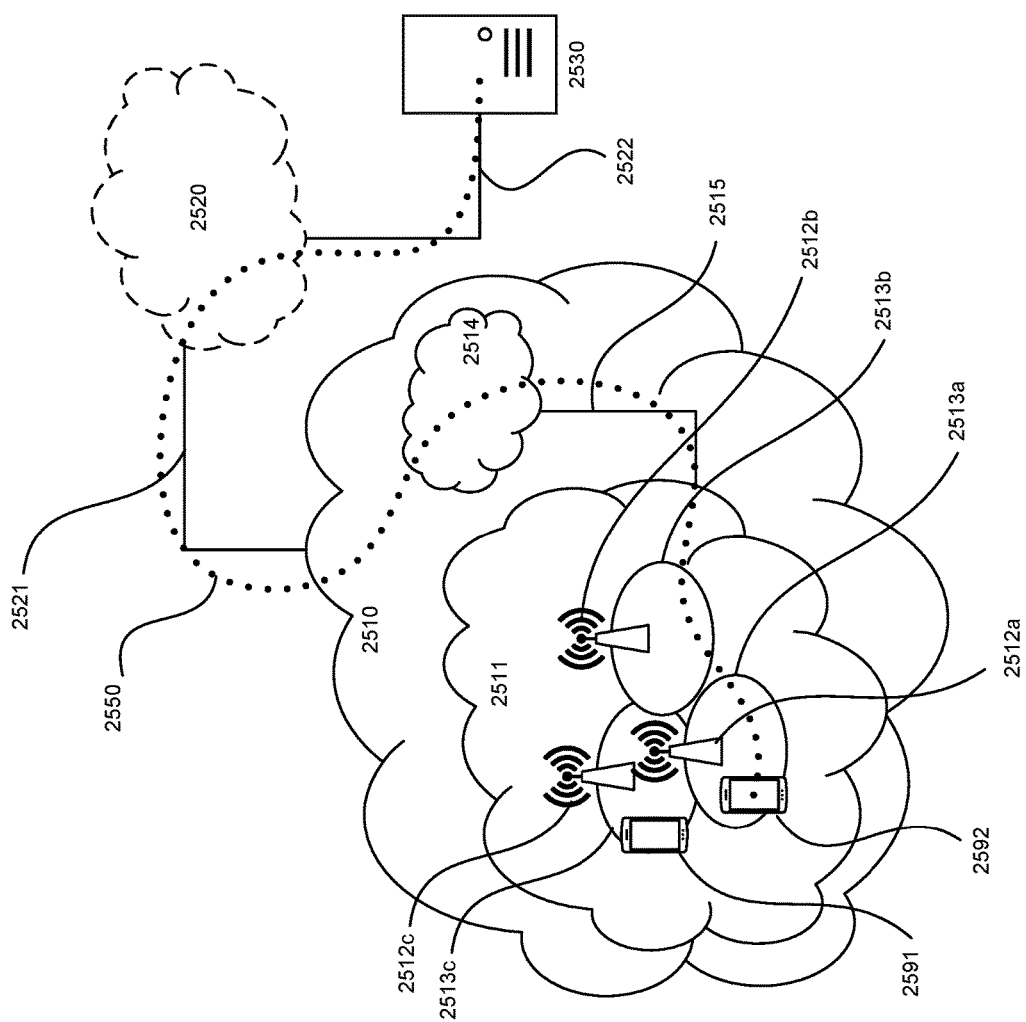
FIG. 25 is a block diagram of a communication network with a host computer according to some embodiments.

FIG. 25 illustrates a telecommunication network connected via an intermediate network to a host computer in accordance with some embodiments. In particular, with reference to FIG. 25, in accordance with an embodiment, a communication system includes telecommunication network 2510, such as a 3GPP-type cellular network, which comprises access network 2511, such as a radio access network, and core network 2514. Access network 2511 comprises a plurality of base stations 2512*a*, 2512*b*, 2512*c*, such as NBs, eNBs, gNBs or other types of wireless access points, each defining a corresponding coverage area 2513*a*, 2513*b*, 2513*c*. Each base station 2512*a*, 2512*b*, 2512*c* is connectable to core network 2514 over a wired or wireless connection 2515. A first UE 2591 located in coverage area 2513*c* is configured to wireles sly connect to, or be paged by, the corresponding base station 2512*c*. A second UE 2592 in coverage area 2513*a* is wirelessly connectable to the corresponding base station 2512*a*. While a plurality of UEs 2591, 2592 are illustrated in this example, the disclosed embodiments are equally applicable to a situation where a sole UE is in the coverage area or where a sole UE is connecting to the corresponding base station 2512.

Telecommunication network 2510 is itself connected to host computer 2530, which may be embodied in the hardware and/or software of a standalone server, a cloud-implemented server, a distributed server or as processing resources in a server farm. Host computer 2530 may be under the ownership or control of a service provider, or may be operated by the service provider or on behalf of the service provider. Connections 2521 and 2522 between telecommunication network 2510 and host computer 2530 may extend directly from core network 2514 to host computer 2530 or may go via an optional intermediate network 2520. Intermediate network 2520 may be one of, or a combination of more than one of, a public, private or hosted network; intermediate network 2520, if any, may be a backbone network or the Internet; in particular, intermediate network 2520 may comprise two or more sub-networks (not shown).

The communication system of FIG. 25 as a whole enables connectivity between the connected UEs 2591, 2592 and host computer 2530. The connectivity may be described as an over-the-top (OTT) connection 2550. Host computer 2530 and the connected UEs 2591, 2592 are configured to communicate data and/or signaling via OTT connection 2550, using access network 2511, core network 2514, any intermediate network 2520 and possible further infrastructure (not shown) as intermediaries. OTT connection 2550 may be transparent in the sense that the participating communication devices through which OTT connection 2550 passes are unaware of routing of uplink and downlink communications. For example, base station 2512 may not or need not be informed about the past routing of an incoming downlink communication with data originating from host computer 2530 to be forwarded (e.g., handed over) to a connected UE 2591. Similarly, base station 2512 need not be aware of the future routing of an outgoing uplink communication originating from the UE 2591 towards the host computer 2530.

Figure 26:
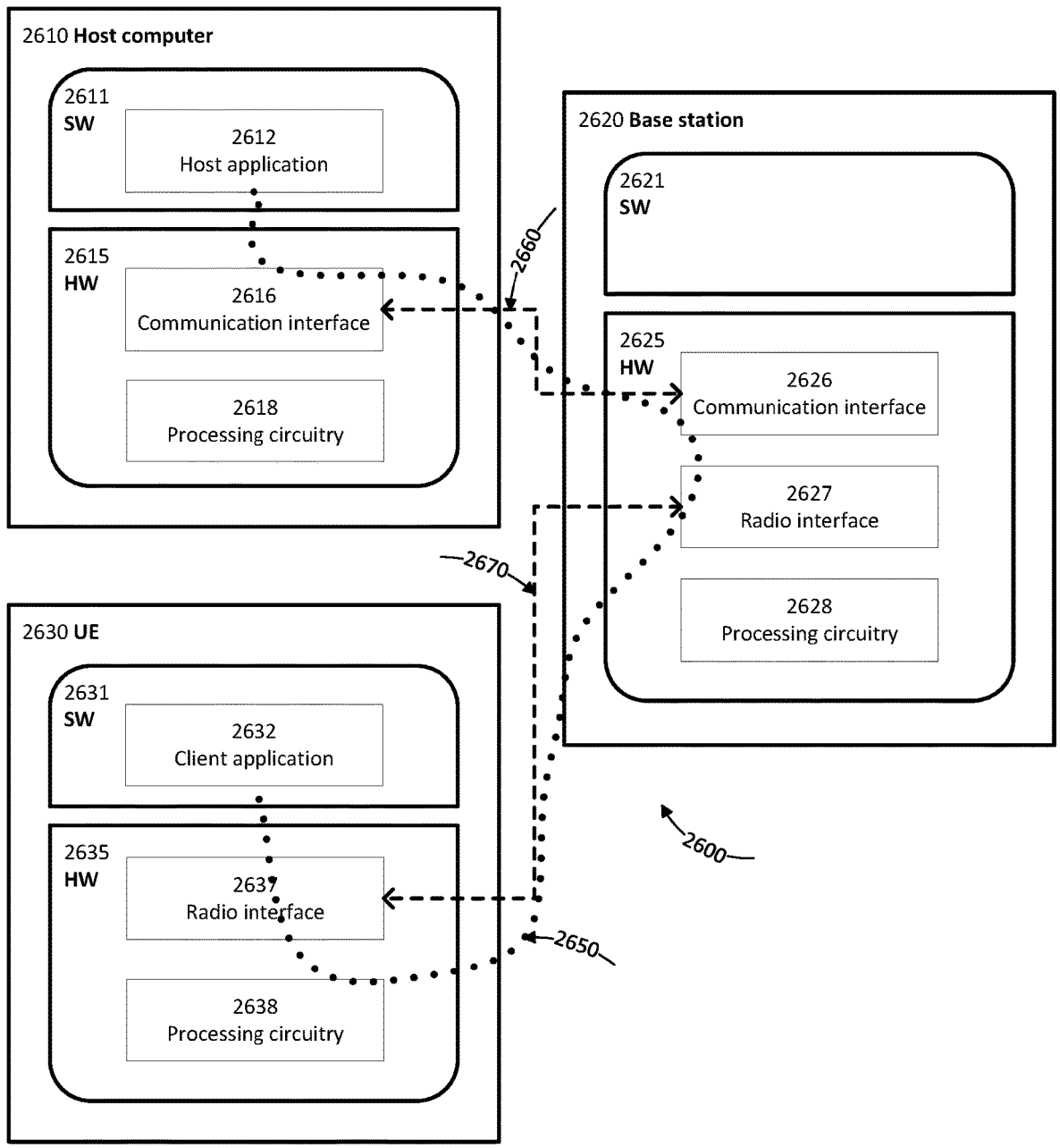
FIG. 26 is a block diagram of a host computer according to some embodiments.

Example implementations, in accordance with an embodiment, of the UE, base station and host computer discussed in the preceding paragraphs will now be described with reference to FIG. 26. FIG. 26 illustrates host computer communicating via a base station with a user equipment over a partially wireless connection in accordance with some embodiments. In communication system 2600, host computer 2610 comprises hardware 2615 including communication interface 2616 configured to set up and maintain a wired or wireless connection with an interface of a different communication device of communication system 2600. Host computer 2610 further comprises processing circuitry 2618, which may have storage and/or processing capabilities. In particular, processing circuitry 2618 may comprise one or more programmable processors, application-specific integrated circuits, field programmable gate arrays or combinations of these (not shown) adapted to execute instructions. Host computer 2610 further comprises software 2611, which is stored in or accessible by host computer 2610 and executable by processing circuitry 2618. Software 2611 includes host application 2612. Host application 2612 may be operable to provide a service to a remote user, such as UE 2630 connecting via OTT connection 2650 terminating at UE 2630 and host computer 2610. In providing the service to the remote user, host application 2612 may provide user data which is transmitted using OTT connection 2650.

Communication system 2600 further includes base station 2620 provided in a telecommunication system and comprising hardware 2625 enabling it to communicate with host computer 2610 and with UE 2630. Hardware 2625 may include communication interface 2626 for setting up and maintaining a wired or wireless connection with an interface of a different communication device of communication system 2600, as well as radio interface 2627 for setting up and maintaining at least wireless connection 2670 with UE 2630 located in a coverage area (not shown in FIG. 26) served by base station 2620. Communication interface 2626 may be configured to facilitate connection 2660 to host computer 2610. Connection 2660 may be direct or it may pass through a core network (not shown in FIG. 26) of the telecommunication system and/or through one or more intermediate networks outside the telecommunication system. In the embodiment shown, hardware 2625 of base station 2620 further includes processing circuitry 2628, which may comprise one or more programmable processors, application-specific integrated circuits, field programmable gate arrays or combinations of these (not shown) adapted to execute instructions. Base station 2620 further has software 2621 stored internally or accessible via an external connection.

Communication system 2600 further includes UE 2630 already referred to. Its hardware 2635 may include radio interface 2637 configured to set up and maintain wireless connection 2670 with a base station serving a coverage area in which UE 2630 is currently located. Hardware 2635 of UE 2630 further includes processing circuitry 2638, which may comprise one or more programmable processors, application-specific integrated circuits, field programmable gate arrays or combinations of these (not shown) adapted to execute instructions. UE 2630 further comprises software 2631, which is stored in or accessible by UE 2630 and executable by processing circuitry 2638. Software 2631 includes client application 2632. Client application 2632 may be operable to provide a service to a human or non-human user via UE 2630, with the support of host computer 2610. In host computer 2610, an executing host application 2612 may communicate with the executing client application 2632 via OTT connection 2650 terminating at UE 2630 and host computer 2610. In providing the service to the user, client application 2632 may receive request data from host application 2612 and provide user data in response to the request data. OTT connection 2650 may transfer both the request data and the user data. Client application 2632 may interact with the user to generate the user data that it provides.

It is noted that host computer 2610, base station 2620 and UE 2630 illustrated in FIG. 26 may be similar or identical to host computer 2530, one of base stations 2512a, 2512b, 2512c and one of UEs 2591, 2592 of FIG. 25, respectively. This is to say, the inner workings of these entities may be as shown in FIG. 26 and independently, the surrounding network topology may be that of FIG. 25.

In FIG. 26, OTT connection 2650 has been drawn abstractly to illustrate the communication between host computer 2610 and UE 2630 via base station 2620, without explicit reference to any intermediary devices and the precise routing of messages via these devices. Network infrastructure may determine the routing, which it may be configured to hide from UE 2630 or from the service provider operating host computer 2610, or both. While OTT connection 2650 is active, the network infrastructure may further take decisions by which it dynamically changes the routing (e.g., on the basis of load balancing consideration or reconfiguration of the network).

Wireless connection 2670 between UE 2630 and base station 2620 is in accordance with the teachings of the embodiments described throughout this disclosure. One or more of the various embodiments improve the performance of OTT services provided to UE 2630 using OTT connection 2650, in which wireless connection 2670 forms the last segment. More precisely, the teachings of these embodiments may improve the latency and power consumption of the UE and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 2650 between host computer 2610 and UE 2630, in response to variations in the measurement results. The measurement procedure and/or the network functionality for reconfiguring OTT connection 2650 may be implemented in software 2611 and hardware 2615 of host computer 2610 or in software 2631 and hardware 2635 of UE 2630, or both. In embodiments, sensors (not shown) may be deployed in or in association with communication devices through which OTT connection 2650 passes; the sensors may participate in the measurement procedure by supplying values of the monitored quantities exemplified above, or supplying values of other physical quantities from which software 2611, 2631 may compute or estimate the monitored quantities. The reconfiguring of OTT connection 2650 may include message format, retransmission settings, preferred routing etc.; the reconfiguring need not affect base station 2620, and it may be unknown or imperceptible to base station 2620. Such procedures and functionalities may be known and practiced in the art. In certain embodiments, measurements may involve proprietary UE signaling facilitating host computer 2610's measurements of throughput, propagation times, latency and the like. The measurements may be implemented in that software 2611 and 2631 causes messages to be transmitted, in particular empty or 'dummy' messages, using OTT connection 2650 while it monitors propagation times, errors etc.

Figure 27:
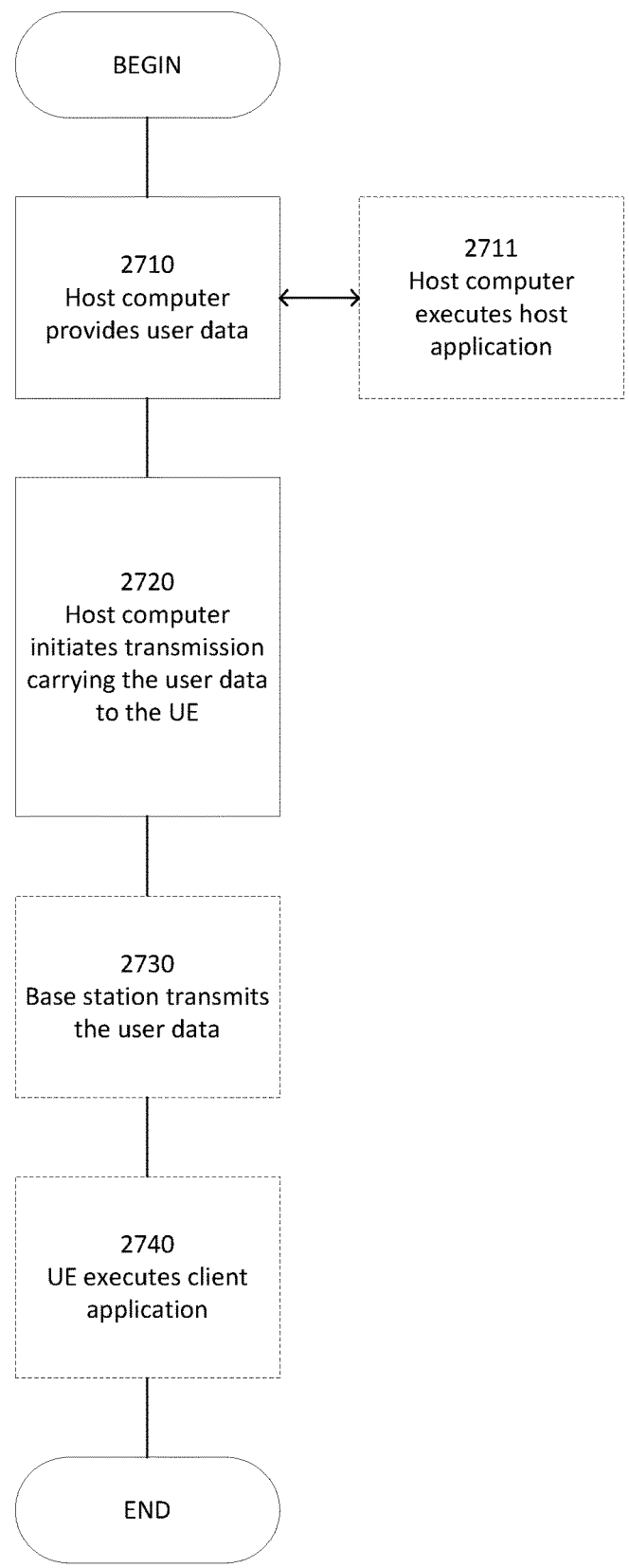
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In step 2710, the host computer provides user data. In substep 2711 (which may be optional) of step 2710, the host computer provides the user data by executing a host application. In step 2720, the host computer initiates a transmission carrying the user data to the UE. In step 2730 (which may be optional), the base station transmits to the UE the user data which was carried in the transmission that the host computer initiated, in accordance with the teachings of the embodiments described throughout this disclosure. In step 2740 (which may also be optional), the UE executes a client application associated with the host application executed by the host computer.

Figure 28:
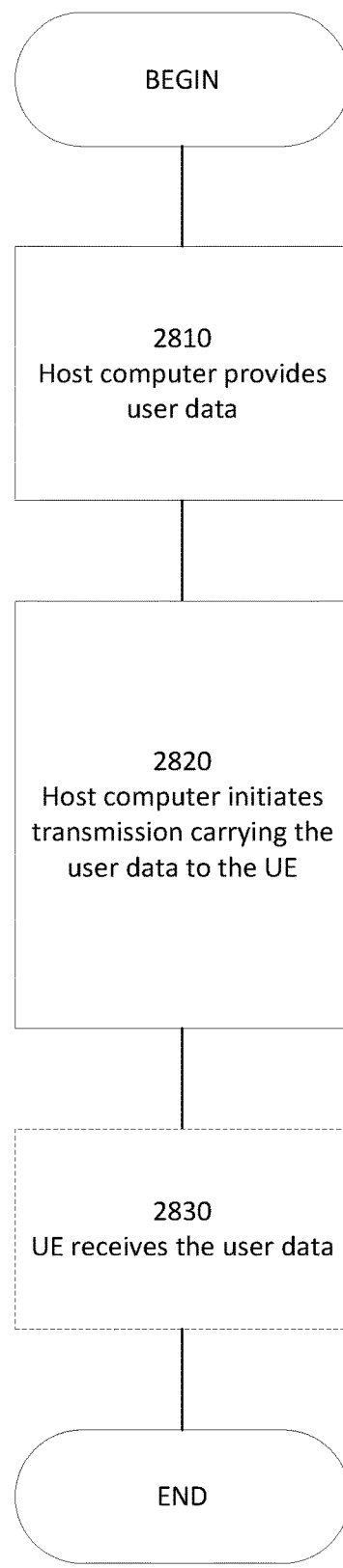
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In step 2810 of the method, the host computer provides user data. In an optional substep (not shown) the host computer provides the user data by executing a host application. In step 2820, the host computer initiates a transmission carrying the user data to the UE. The transmission may pass via the base station, in accordance with the teachings of the embodiments described throughout this disclosure. In step 2830 (which may be optional), the UE receives the user data carried in the transmission.

Figure 29:
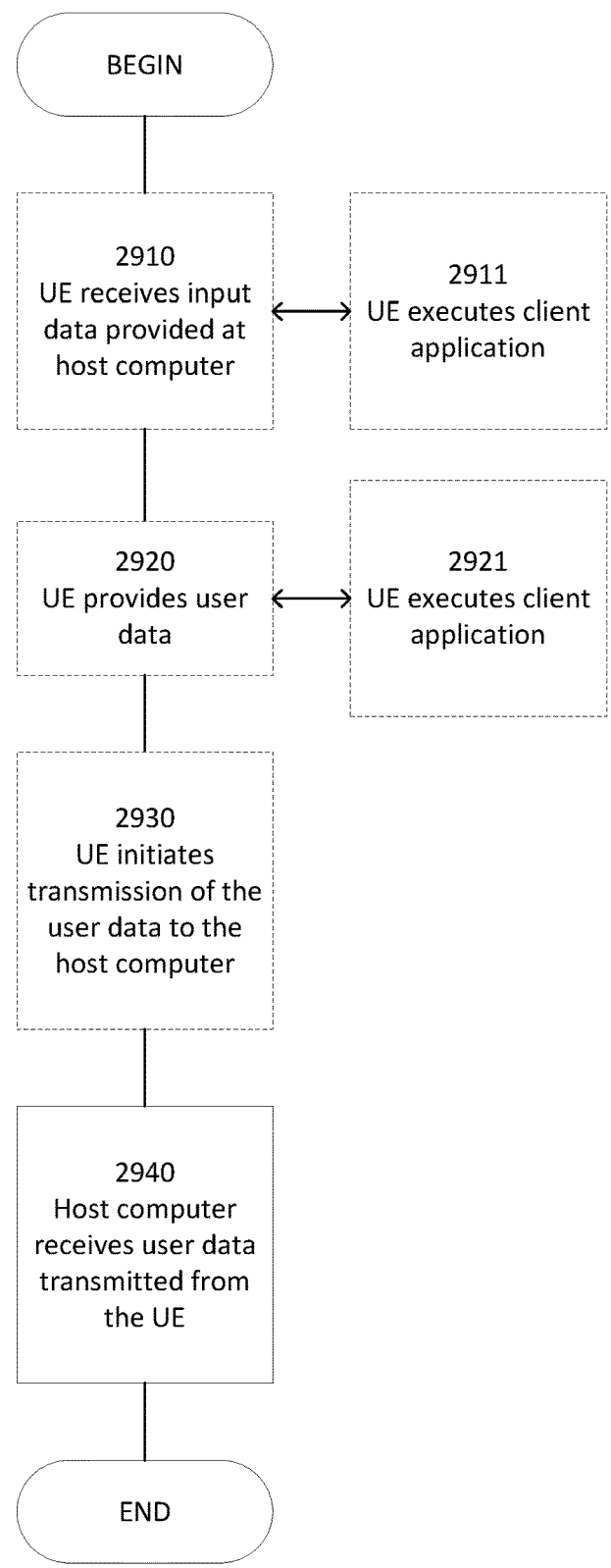
FIG. 29 is a flowchart illustrating a method implemented in a communication system, in accordance with one embodiment.

FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 29 will be included in this section. In step 2910 (which may be optional), the UE receives input data provided by the host computer. Additionally or alternatively, in step 2920, the UE provides user data. In substep 2921 (which may be optional) of step 2920, the UE provides the user data by executing a client application. In substep 2911 (which may be optional) of step 2910, the UE executes a client application which provides the user data in reaction to the received input data provided by the host computer. In providing the user data, the executed client application may further consider user input received from the user. Regardless of the specific manner in which the user data was provided, the UE initiates, in substep 2930 (which may be optional), transmission of the user data to the host computer. In step 2940 of the method, the host computer receives the user data transmitted from the UE, in accordance with the teachings of the embodiments described throughout this disclosure.

Figure 30:
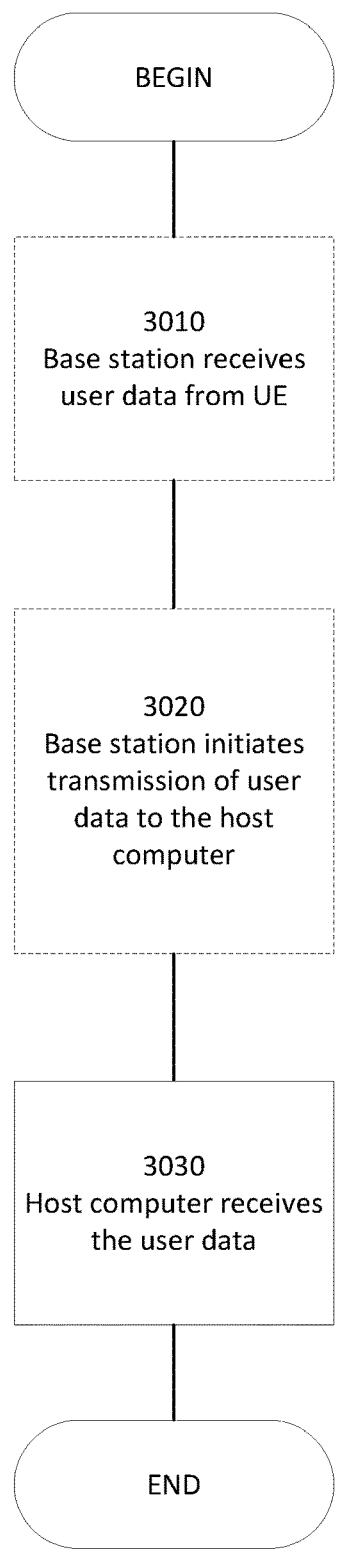
FIG. 30 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 30 will be included in this section. In step 3010 (which may be optional), in accordance with the teachings of the embodiments described throughout this disclosure, the base station receives user data from the UE. In step 3020 (which may be optional), the base station initiates transmission of the received user data to the host computer. In step 3030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device configured for use in a wireless communication network, the method comprising:

transmitting, to a network node in the wireless communication network, signaling indicating a minimum period that the wireless device requires between the end of a wake-up signal and the start of a paging occasion in order for the wireless device to be able to receive a paging message in that paging occasion, wherein the indicated minimum period is a first wake-up period over which the wireless device is capable of awakening from a first sleep state, wherein in the first sleep state the wireless device is configured to monitor for a wake-up signal using a wake-up receiver;

receiving, from a radio network node, signaling indicating a maximum period that the radio network node supports between the end of a wake-up signal and the start of a paging occasion; and responsive to inactivity, determining whether or not to enter the first sleep state depending respectively on whether or not the first wake-up period is less than or equal to the maximum period supported by the radio network node.

2. The method of claim 1, further comprising:

receiving a wake-up signal; and responsive to receiving the wake-up signal, monitoring for a paging message during a paging occasion that starts after at least the minimum period has passed since the end of the wake-up signal.

3. The method of claim 2, further comprising refraining from monitoring one or more other paging occasions that occur between the end of the received wake-up signal and the start of the paging occasion during which the wireless device monitors for a paging message.

4. The method of claim 2, wherein the paging occasion is a first paging occasion that occurs within a paging transmission window for the wireless device, wherein the first paging occasion occurs within the paging transmission window before any other paging occasion within the paging transmission window, wherein the paging transmission window starts at least the minimum period since the end of the wake-up signal.

5. The method of claim 2, wherein the minimum period indicated by the transmitted signaling is less than or equal to the maximum period supported by the radio network node, wherein receiving the wake-up signal comprises receiving the wake-up signal using a wake-up receiver, wherein the method further comprises, responsive to receiving the wake-up signal, awakening the wireless device from a sleep state, wherein said awakening includes activating one or more other receivers of the wireless device, and wherein said monitoring comprises, after awakening the wireless device from the sleep state, using the one or more other receivers to monitor for a paging message during a paging occasion that starts after at least the minimum period since the end of the wake-up signal.

6. The method of claim 1, further comprising:

responsive to determining not to enter the first sleep state, entering a second sleep state, wherein the wireless device is configured to awaken from the second sleep state over a second wake-up period that is shorter in duration than the first wake-up period; and in the second sleep state, monitoring for a wake-up signal using one or more other receivers that are different than the wake-up receiver.

7. The method of claim 1, wherein the wireless device has a wake-up receiver and one or more other receivers, wherein the method further comprises monitoring for a wake-up signal using the wake-up receiver or the one or more other receivers, depending respectively on whether or not the indicated minimum period is less than the maximum period supported by the radio network node.

8. The method of claim 1, wherein the network node is core network node, wherein the core network node is a mobility management entity, MME, or implements an access and mobility function, AMF.

9. A wireless device configured for use in a wireless communication network, the wireless device comprising:

communication circuitry; and processing circuitry configured to:

transmit, to a network node in the wireless communication network, signaling indicating a minimum period that the wireless device requires between the end of a wake-up signal and the start of a paging occasion in order for the wireless device to be able to receive a paging message in that paging occasion, wherein the indicated minimum period is a first wake-up period over which the wireless device is capable of awakening from a first sleep state, wherein in the first sleep state the wireless device is configured to monitor for a wake-up signal using a wake-up receiver;

receive, from a radio network node, signaling indicating a maximum period that the radio network node supports between the end of a wake-up signal and the start of a paging occasion; and responsive to inactivity, determine whether or not to enter the first sleep state depending respectively on whether or not the first wake-up period is less than or equal to the maximum period supported by the radio network node.

10. The wireless device of claim 9, wherein the processing circuitry is further configured to:

receive a wake-up signal; and responsive to receiving the wake-up signal, monitor for a paging message during a paging occasion that starts after at least the minimum period has passed since the end of the wake-up signal.

11. The wireless device of claim 10, wherein the processing circuitry is further configured to refrain from monitoring one or more other paging occasions that occur between the end of the received wake-up signal and the start of the paging occasion during which the wireless device monitors for a paging message.

12. The wireless device of claim 10, wherein the paging occasion is a first paging occasion that occurs within a paging transmission window for the wireless device, wherein the first paging occasion occurs within the paging transmission window before any other paging occasion within the paging transmission window, wherein the paging transmission window starts at least the minimum period since the end of the wake-up signal.

13. The wireless device of claim 10, wherein the minimum period indicated by the transmitted signaling is less than or equal to the maximum period supported by the radio network node, wherein the processing circuitry is configured receive the wake-up signal using a wake-up receiver, wherein the processing circuitry is further configured to, responsive to receiving the wake-up signal, awaken the wireless device from a sleep state by activating one or more other receivers of the wireless device, and wherein the processing circuitry is configured to, after awakening the wireless device from the sleep state, use the one or more other receivers to monitor for a paging message during a paging occasion that starts after at least the minimum period since the end of the wake-up signal.

14. The wireless device of claim 9, wherein the processing circuitry is further configured to:
- responsive to determining not to enter the first sleep state, enter a second sleep state, wherein the wireless device is configured to awaken from the second sleep state over a second wake-up period that is shorter in duration than the first wake-up period; and
- in the second sleep state, monitor for a wake-up signal using one or more other receivers that are different than the wake-up receiver.

15. The wireless device of claim 9, wherein the wireless device has a wake-up receiver and one or more other receivers, wherein the processing circuitry is further configured to monitor for a wake-up signal using the wake-up receiver or the one or more other receivers, depending respectively on whether or not the indicated minimum period is less than the maximum period supported by the radio network node.

16. The wireless device of claim 9, wherein the network node is core network node, wherein the core network node is a mobility management entity, MME, or implements an access and mobility function, AMF.

* * * * *

UNITED STATES PATENT AND TRADEMARK OFFICE
CERTIFICATE OF CORRECTION

PATENT NO. : 11,265,813 B2
APPLICATION NO. : 16/407991
DATED : March 1, 2022
INVENTOR(S) : Åström et al.

It is certified that error appears in the above-identified patent and that said Letters Patent is hereby corrected as shown below:

On the Title Page

Item (57), under "Abstract", in Column 2, Line 5, delete "period (20B)" and insert -- wake-up period (20B) --, therefor.

In the Drawings

In Fig. 19, Sheet 17 of 28, under "Step 4", Line 1, delete "XPDCCH" and insert -- xPDCCH --, therefor.

In Fig. 22, Sheet 20 of 28, for Tag "2274", Lines 1-2, delete "Baseband Circuitry" and insert -- Baseband Processing Circuitry --, therefor.

In Fig. 22, Sheet 20 of 28, for Tag "2224", Lines 1-2, delete "Baseband Circuitry" and insert -- Baseband Processing Circuitry --, therefor.

In Fig. 23, Sheet 21 of 28, for Tag "2301", Line 1, delete "Processor" and insert -- Processing Circuitry --, therefor.

In the Specification

In Column 8, Line 15, delete "TWUS," and insert -- $T_{WUS}$, --, therefor.

In Column 8, Line 17, delete "TAWAKE." and insert -- $T_{AWAKE}$. --, therefor.

In Column 8, Line 28, delete "TAWAKE," and insert -- $T_{AWAKE}$, --, therefor.

In Column 10, Line 67, delete "WUP 34A 1," and insert -- WUP 34A-1, --, therefor.

Signed and Sealed this
Sixteenth Day of August, 2022

*Katherine Kelly Vidal*
*Director of the United States Patent and Trademark Office*

CERTIFICATE OF CORRECTION (continued)
U.S. Pat. No. 11,265,813 B2

In Column 12, Line 13, delete "maximum period 34A" and insert -- maximum wake-up period 34A --, therefor.

In Column 13, Line 54, delete "maximum period 34A" and insert -- maximum wake-up period 34A --, therefor.

In Column 20, Line 53, delete "system information (SIB2)." and insert -- system information block (SIB). --, therefor.

In Column 33, Line 55, delete "power source 2333," and insert -- transmitter 2333, --, therefor.

In Column 38, Line 24, delete "wireles sly" and insert -- wirelessly --, therefor.

In the Claims

In Column 44, Line 57, in Claim 13, delete "configured" and insert -- configured to --, therefor.